United States Patent
Sugi

(10) Patent No.: US 7,411,743 B2
(45) Date of Patent: *Aug. 12, 2008

(54) MULTI-WAVELENGTH LENS, AND OPTICAL SYSTEM, OPTICAL HEAD AND OPTICAL DISC APPARATUS USING THE LENS

(75) Inventor: Yasuyuki Sugi, Naka-gun (JP)

(73) Assignee: Hitachi Maxell, Ltd., Ibaraki (JP)

( * ) Notice: Subject to any disclaimer, the term of this patent is extended or adjusted under 35 U.S.C. 154(b) by 690 days.

This patent is subject to a terminal disclaimer.

(21) Appl. No.: 10/886,655

(22) Filed: Jul. 9, 2004

(65) Prior Publication Data

US 2005/0007935 A1   Jan. 13, 2005

(30) Foreign Application Priority Data

Jul. 10, 2003   (JP)   ............................. 2003-273055

(51) Int. Cl.
*G02B 13/02*   (2006.01)
*G02B 13/00*   (2006.01)
*G11B 7/00*   (2006.01)

(52) U.S. Cl. ................. 359/719; 369/112.23

(58) Field of Classification Search ........... 369/112.08, 369/112.23, 112.07; 359/742, 743, 565, 359/719; *G11B 7/00; G02B 13/00*
See application file for complete search history.

(56) References Cited

U.S. PATENT DOCUMENTS

| | | | |
|---|---|---|---|
| 6,118,594 A | | 9/2000 | Maruyama |
| 6,515,955 B2 * | | 2/2003 | Takeuchi ............... 369/112.08 |
| 6,678,096 B2 * | | 1/2004 | Sugi et al. .................. 359/719 |
| 6,687,209 B2 * | | 2/2004 | Ota et al. ................ 369/112.08 |
| 6,728,172 B2 * | | 4/2004 | Ikenaka et al. ........... 369/44.23 |
| 6,992,838 B2 * | | 1/2006 | Park ........................... 359/719 |
| 7,038,862 B2 * | | 5/2006 | Maruyama et al. .......... 359/719 |

FOREIGN PATENT DOCUMENTS

| | | |
|---|---|---|
| JP | A 07-294707 | 11/1995 |
| JP | A 9-145995 | 6/1997 |
| JP | A 2000-81566 | 3/2000 |
| JP | A 2001-51192 | 2/2001 |
| JP | A 2001-315003 | 11/2001 |
| JP | A 2002-189114 | 7/2002 |
| JP | A 2003-123303 | 4/2003 |

\* cited by examiner

*Primary Examiner*—Aristotelis M Psitos
(74) *Attorney, Agent, or Firm*—Oliff & Berridge, PLC

(57) ABSTRACT

The multi-wavelength lens for condensing a plurality of kinds of monochromatic light by refraction is disclosed. The lens comprises a common use area for all monochromatic light on at least one lens surface, the area sectioned into a plurality of aspherical zones each of which having a different refractive power; and step portions, each of which formed between adjacent aspherical zones of the plurality of aspherical zones and having a step height Dj (j=1,2,3,4, and so on, in order of closeness to a lens optical axis) in a direction parallel to the lens optical axis. At least half of the step portions satisfy a following formula when a minimum value and a maximum value of Aij for each wavelength $\lambda i$ are MIN(Aij) and MAX (Aij), respectively:

MAX($Aij$)/MIN($Aij$)<3 where, Aij=absolute(Bij−mij),
Bij=(absolute(Dj))*(ni−1)/$\lambda$i−C, ni is a refractive index of a lens for a wavelength $\lambda$i, mij is an integral number closest to Bij, and C is a corrective term.

7 Claims, 20 Drawing Sheets

MULTI-WAVELENGTH LENS, AND OPTICAL SYSTEM, OPTICAL HEAD AND OPTICAL DISC APPARATUS USING THE LENS

CROSS-REFERENCE TO RELATED APPLICATION

The present invention is related to Japanese Patent Application Serial No. 2003-273055, which is hereby incorporated.

BACKGROUND OF THE INVENTION

1. Field of the Invention

The present invention relates to a general-purpose multi-wavelength lens used in a recording and reproducing apparatus of a multi-wavelength optical system using a plurality of kinds of monochromatic light which is compatible with optical storage medium of different types such as compact discs (CD) including CD-R, digital versatile discs (DVD), and Blue-laser-based advanced optical discs (AOD), and a multi-wavelength optical system, an optical head and an optical disc apparatus.

2. Related Background Art

Conventionally, compatible optical disc apparatus capable of reproducing different types of optical discs such as CD and DVD have been proposed. The CD and DVD (which will be hereinafter collectively referred to as an optical disc) have a transparent substrate, one side of which has an information surface. The optical disc is composed of two transparent substrates combined together with their information surfaces facing each other, or composed of a transparent substrate and a transparent protection substrate with the information surface of the transparent substrate facing the protection substrate. To reproduce information signals stored in these optical discs, the optical disc apparatus condenses a laser beam from a light source on the information surface of the optical disc through the transparent substrate. As detailed later, wavelengths of the laser beam used for CD and for DVD are different. The optical disc apparatus uses an objective lens for condensing the laser beam. The thickness of the transparent substrate provided with the information surface differs according to a type of the optical disc (a difference in a laser beam wavelength). While the transparent substrate of CD is 1.2 mm in thickness, that of DVD is 0.6 mm. For the optical disc apparatus to reproduce optical discs of different types, it is required to condense a laser beam on the information surface even if the thickness of the transparent substrate differs with the type of the optical disc. Besides, a new optical disc apparatus using Blue-laser of approximately 400 nm wavelength for reproducing information is recently proposed. Thus, it is desirable for the optical disc apparatus to be compatible with the new optical disc in addition to CD and the existing DVD.

One approach for the above optical disc apparatus is to provide a pickup with objective lenses for different types of optical discs to change the objective lenses in accordance with the type of the optical disc in use, or to provide pickups for different types of the optical discs to change the pickups in accordance with the type of the optical disc in use. However, for miniaturization and cost reduction, it is preferred to have a single objective lens usable for any types of the optical disc.

Known as this kind of objective lens is one disclosed in Japanese Unexamined Patent Application Publication No. H09-145995, for example. A lens surface of the objective lens disclosed therein is radially sectioned into more than two loop zones, and every other loop zonal lens surfaces and the other every other loop zonal lens surfaces are different in refracting power. For laser beams of the same wavelength, the every other loop zonal lens surfaces condense the laser beams on the information surface of the optical disc (DVD) having a thinner transparent substrate (0.6 mm), and the other every other zonal lens surfaces condense the laser beams on the information surface of the optical disc (CD) having a thicker transparent substrate (1.2 mm), for example.

Another example is one disclosed in Japanese Unexamined Patent Application Publication No. 2000-81566 (U.S. Pat. No. 6,118,594). It discloses the optical disc apparatus using a laser beam of a shorter wavelength (635 nm or 650 nm) for DVD having a thinner transparent substrate while using a laser beam of a longer wavelength (780 nm) for CD having a thicker transparent substrate. The optical disc apparatus is provided with an objective lens used in common for the two kinds of laser beams. The objective lens has a diffractive lens structure where a plurality of minute loop zonal steps are thickly formed on one side of a refractive lens having a positive refractive power. The diffractive lens structure is designed to condense, on the information surface, diffracted light of laser beams having a shorter wavelength for DVD with a thinner transparent substrate and diffracted light of laser beams having a longer wavelength for CD with a thicker transparent substrate. Further, the lens is designed to condense diffracted light having the same diffractive order for both of the diffracted light. The laser beam having the shorter wavelength is used for DVD because a storage density of DVD is higher than that of CD, thus requiring a smaller beam spot. As well known, the diameter of an optical spot is proportional to a wavelength and inversely proportional to a numerical aperture (NA).

There is also disclosed an objective lens of a loop zonal phase correction lens type having a loop zonal phase shifter on the lens surface in Japanese Unexamined Patent Application Publication No. 2001-51192. In this lens, a lens surface designed to have no wavefront aberration for a laser beam having wavelength $\lambda_1$ of 640 nm is first set as a reference. A surface of the objective lens is then radially sectioned into a plurality of loop refractive zones which are formed to have predetermined steps (i-th step from a center of the lens is referred to as $d_i$) from the reference lens surface. Due to the step $d_i$, each of the refractive surfaces allows the laser beam of DVD to phase-shift by integral multiple $m_i$ of the wavelength $\lambda_1$ against the reference lens surface, thereby reducing wavefront aberration in a CD system.

The above conventional techniques allow a common objective lens to be used for both DVD and CD. This eliminates the need for changing members including objective lenses for each use of DVD or CD, which is effective in reducing costs and simplifying the structure. However, the technique disclosed in Japanese Unexamined Patent Application Publication No. H09-145995 uses different loop zonal lens surface of the objective lens for DVD to CD, causing a large area to remain inactive for incident laser beams, which extremely lowers light use efficiency.

Further, the technique disclosed in Japanese Unexamined Patent Application Publication No. 2000-81566 (U.S. Pat. No. 6,118,594) has a problem that diffractive efficiencies for different wavelengths are unable to become 100% at the same time because it uses the diffracted light by the diffractive lens structure. In this diffractive lens, for a laser beam having the shorter wavelength (635 nm or 650 nm) used for DVD and for a laser beam having the longer wavelength (780 nm) used for CD, the diffractive efficiency is designed to become 100% at intermediate wavelength between the two in order to make the diffractive efficiency well balanced for the laser beams in use. Besides, the technique requires minute steps to be formed on the lens surface to make the diffraction lens structure, which is vulnerable to processing error. If the diffractive structure fails to be formed as designed, it causes a decrease in the diffractive efficiently. When the diffractive efficiency decreases or when it does not reach 100%, it is unable to condense all the incident light on the information surface formed on the transparent substrate of the optical disc, which results in the light loss.

Further, the loop zonal phase correction lens type disclosed in Japanese Unexamined Patent Application Publication No. 2001-51192 has the following problem. This conventional technique sets the lens surface designed to have no wavefront aberration for the DVD laser beam as a reference surface, and forms a refractive surface lower than the reference surface by the height of a step $d_i$, which is integral multiple $m_i$ of the wavelength $\lambda_1$ of the DVD laser beam so as to reduce the wavefront aberration for the CD laser beam. Further, this technique designs the curved surface structure of each loop zone to prevent a focal point in each loop zone from shifting due to the formation of the step on the lens surface. Though, however, this technique allows sufficient decrease in the wavefront aberration for DVD, it does not achieve sufficient decrease in the wavefront aberration for the CD laser beam.

Many conventional arts including "Principle of Optics", The Optronics Co., Ltd., Nov. 26, 1990, p.198 describe that the appropriate value of RMS wavefront aberration is 0.07 λRMS and below, according to Marechal criterion. Japanese Unexamined Patent Application Publication No. 2001-51192 mentioned above also discloses the embodiment to suppress the wavefront aberration to 0.07 λRMS or less. In optical disc apparatus, however, the value of 0.07 λRMS or less should be a target value of the optical disc apparatus as a whole, and this value is still not sufficiently low for a target value of a single objective lens. Since an optical disc as a whole has various factors to undesirably increase the RMS wavefront aberration, such as astigmatic difference of a laser, aberration of a collimator lens, aberration of a reflecting mirror and a transmitting mirror, and tilt displacement of an optical pickup and an optical disc, the RMS wavefront aberration should be as low as possible, not just 0.07 λRMS or less, in a single objective lens. Specifically, the RMS wavefront aberration for a single objective lens is preferably 0.035 λRMS or less, more preferably 0.030 λRMS or less, and further preferably 0.025 λRMS or less. In Japanese Unexamined Patent Application Publication No.2001-51192, the RMS wavefront aberration is 0.001 λRMS for DVD and 0.047 λRMS for CD in the first embodiment, and it is 0.019 λRMS for DVD and 0.037 λRMS for CD in the second embodiment. The suitable wavefront aberration is achieved for DVD, but not for CD, which still exceeds 0.037 λRMS. This technique thus fails to achieve sufficiently low wavefront aberration for both DVD and CD.

SUMMARY OF THE INVENTION

The present invention has been accomplished to solve the above problems and an object of the present invention is thus to provide a lens which can condense light beams on an information surface of each of a plurality of kinds of optical recording media with wavefront aberration of as low as possible and at a high light use efficiency, and an optical system, optical head and optical disc apparatus using the lens.

To these ends, according to one aspect of the present invention, there is provided a multi-wavelength lens for condensing a plurality of kinds of monochromatic light by refraction, comprising a common use area for all monochromatic light on at least one lens surface, the area sectioned into a plurality of aspherical zones each of which having a different refractive power; and step portions, each of which formed between adjacent aspherical zones of the plurality of aspherical zones and having a step height Dj (j=1,2,3,4, and so on, in order of closeness to a lens optical axis) in a direction parallel to the lens optical axis, wherein at least half of the step portions satisfy a following formula when a minimum value and a maximum value of Aij for each wavelength λi are MIN(Aij) and MAX(Aij) respectively:

MAX(*Aij*)/MIN(*Aij*)<3, where Aij=absolute(Bij−mij),

Bij=(absolute(Dj))*(ni−1)/λi−C, ni is a refractive index of a lens for a wavelength λi, mij is an integral number closest to Bij, and C is a corrective term.

In the above multi-wavelength lens, the corrective term C may be calculated based on a numerical aperture (NA) of each of the aspherical zones defined by each of the step portions for a wavelength λi.

According to another aspect of the present invention, there is provided a multi-wavelength lens for condensing a plurality of kinds of monochromatic light by refraction, comprising a common use area for all monochromatic light on at least one lens surface, the area sectioned into a plurality of aspherical zones each of which having a different refractive power; and step portions, each of which formed between adjacent aspherical zones of the plurality of aspherical zones and having a step height Dj (j=1,2,3,4, and so on, in order of closeness to a lens optical axis) in a direction parallel to the lens optical axis, wherein at least half of the step portions satisfy a following formula when a minimum value and a maximum value of Aij for each wavelength λi are MIN(Aij) and MAX(Aij), respectively, and a numerical aperture (NA) of each of the aspherical zones defined by a j-th step portion for a wavelength λi is NAij:

MAX(*Aij*)/MIN(*Aij*)<3, where Aij=absolute(Bij−mij),

Bij=(absolute(Dj))*(ni−1)/λi−(NAij$^2$)*K/λi, ni is a refractive index of a lens for a wavelength λi, mij is an integral number closest to Bij, K=0.0004 mm when Aij<0.55, and K=0.0005 mm when NAij>=0.55.

In the above multi-wavelength lens, at least half of the step portions preferably satisfy a following formula: MAX(Aij)/MIN(Aij)<2. More preferably, all of the step portions satisfy the formula: MAX(Aij)/MIN(Aij)<3. Still more preferably, all of the step portions satisfy the formula: MAX(Aij)/MIN(Aij)<2.

According to still another aspect of the present invention, there is provided a multi-wavelength lens for condensing a plurality of kinds of monochromatic light by refraction, comprising a common use area for all monochromatic light on at least one lens surface, the area sectioned into a plurality of aspherical zones each of which having a different refractive power; and step portions, each of which formed between adjacent aspherical zones of the plurality of aspherical zones, and having a step height Dj (j=1,2,3,4, and so on, in order of closeness to a lens optical axis) in a direction parallel to the lens optical axis, which is a distance between the adjacent aspherical zones extended to the step portion, wherein a surface of each of the plurality of aspherical zones has an irregularly-shaped portion in an edge adjacent to each of the step portions, and at least half of the step portions satisfy a following formula when a minimum value and a maximum value of Aij for each wavelength λi are MIN(Aij) and MAX(Aij), respectively, and a numerical aperture (NA) of a j-th step portion for a wavelength λi is NAij:

MAX(*Aij*)/MIN(*Aij*)<3 where, Aij=absolute(Bij−mij),

Bij=(absolute(Dj))*(ni−1)/λi−(NAij$^2$)*K/λi, ni is a refractive index of a lens for a wavelength λi, mij is an integral number closest to Bij, K=0.0004 mm when NAij<0.55, and K=0.0005 mm when NAij>=0.55.

In the above multi-wavelength lens, the irregularly-shaped portion of each of the plurality of aspherical zones may be drafted in a mold pull direction. Further, the irregularly-shaped portion of each of the plurality of aspherical zones may be slightly rounded.

According to other aspects of the present invention, there are provided an optical system using the above lens, an optical head using the above lens, and an optical disc apparatus using the above lens.

According to another aspect of the present invention, there is provided a lens having a positive power for condensing light from a light source to form an optical spot on a focus surface, comprising a use area on one surface or both surfaces of the lens; and a nonuse area located outside of the use area, wherein a diameter of an optical spot obtained when light from the light source is incident on both of the use area and the nonuse are is smaller than a diameter of an optical spot obtained when light from the light source is incident on the use area only.

The above lens may be a multi-wavelength lens for condensing a plurality of kinds of monochromatic light having a plurality of wavelengths, and a nonuse area for a first wavelength serves as a use area for a second wavelength different from the first wavelength.

In this lens, the area serving as the nonuse area for the first wavelength and as the use area for the second wavelength may be sectioned into a plurality of zones on one surface or both surfaces of the lens, and a phase shift due to wavefront aberration caused by light having the second wavelength passing through each of the plurality of zones may be substantially an integral multiple of each other.

As explained in the foregoing, the present invention makes it possible to condense by refraction all luminous flux of numerical aperture (NA) necessary for recordation and reproduction on a desirable position with aberration of as small as possible for more than one type of optical discs provided with transparent substrate having different thickness, without using diffractive lens structure, thus increasing the light use efficiency. Besides, as also explained above, according to the present invention, in a multi-wavelength optical system using a plurality of monochromatic light, each of sectioned aspherical surfaces has a single focal point corresponding to inherent wavelength of each of the monochromatic light, and the focal points are respectively arranged in different positions. The present invention is applicable to an optical system in an optical communication.

The present invention will become more fully understood from the detailed description given hereinbelow and the accompanying drawings which are given by way of illustration only, and thus are not to be considered as limiting the present invention.

DESCRIPTION OF THE PREFERRED EMBODIMENTS

Figure 1A:
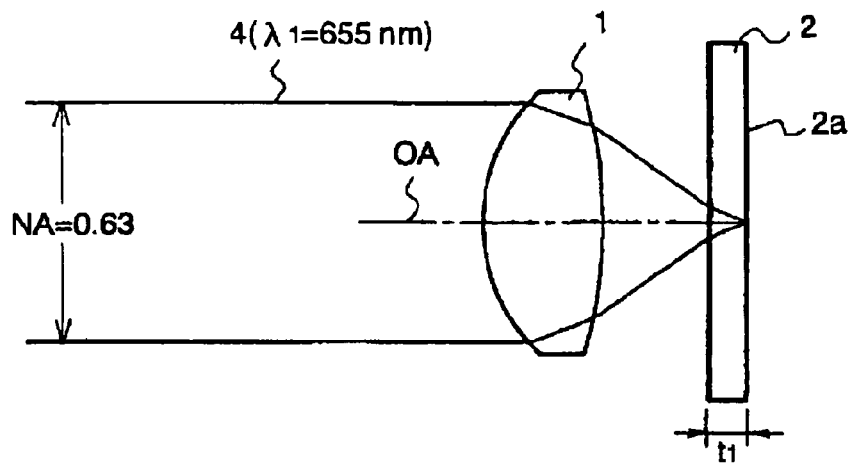
FIGS. 1A and 1B show the first embodiment of an objective lens according to the present invention.

In an optical disc apparatus, for example, aberration in an objective lens is appropriately corrected for the first optical disc provided with a transparent substrate having a thickness of $t_1$ so as to suitably condense laser beams on an information surface formed on the transparent substrate. When the second optical disc provided with a transparent substrate having a different thickness of $t_2$ is installed in the optical disc apparatus, due to the difference of the substrate thickness $t_2$ from $t_1$, the objective lens and the transparent substrate of $t_2$ thickness generate spherical aberration. Therefore, it is unable to suitably condense the laser beams on a information surface formed on the transparent substrate of $t_2$ in thickness.

On the other hand, when laser beams having different wavelengths are used for a optical system consisting of the objective lens and transparent substrate, chromatic aberration is generated. The chromatic aberration in this embodiment is a difference in spherical aberrations generated for each laser beam when an objective lens receives a laser beam having different wavelengths. For example, chromatic aberration generated when an objective lens receives a laser beam of 655 nm wavelength and that of 790 nm wavelength is the difference between spherical aberration generated when the objective lens receives the laser beam of 655 nm wavelength and spherical aberration generated when the objective lens receives the laser beam of 790 nm wavelength.

On condition that the spherical aberration in the substrate thickness $t_1$ is $S_A(t_1)$, and that in the thickness $t_2$ is $S_A(t_2)$, and the spherical aberration in the laser beam wavelength $\lambda_1$ is $S_A(\lambda_1)$, and that in the wavelength $\lambda_2$ is $S_A(\lambda_2)$ the chromatic aberration caused by a difference in wavelength is expressed by the difference in the spherical aberration ($S_A(\lambda_2)-S_A(\lambda_1)$). The present invention designs a lens surface possibly satisfying the following formula.

$$S_A(t_2)-S_A(t_1)=-(S_A(\lambda_2)-S_A(\lambda_1))\qquad\text{Formula 2:}$$

In this structure, for any optical discs provided with substrates having different thickness, when using a laser beam having a wavelength corresponding to a substrate thickness, all the light rays of the laser beam which have passed an objective lens and substrate take optical path length to suitably condense on an information surface of the substrate. As detailed later, a lens according to a preferred embodiment of the present invention has such a structure that a lens surface is sectioned into a plurality of aspherical zones, and each of the aspherical zones has one common single focal point corresponding to the inherent wavelength of one of the monochromatic light, and one focal point corresponding to the inherent wavelength of one of the monochromatic light is arranged in different position with other focal points corresponding to the inherent wavelengths of other monochromatic light.

A case where a laser beam is condensed on an information surface $2a$ of a substrate $2$ with an objective lens $1$ will be explained hereinafter with reference to FIG. 3. A surface A of the objective lens $1$ is a light incident side, and a surface B is a light output side. The information surface $2a$ is on the reverse of the side facing the objective lens $1$.

Figure 3:
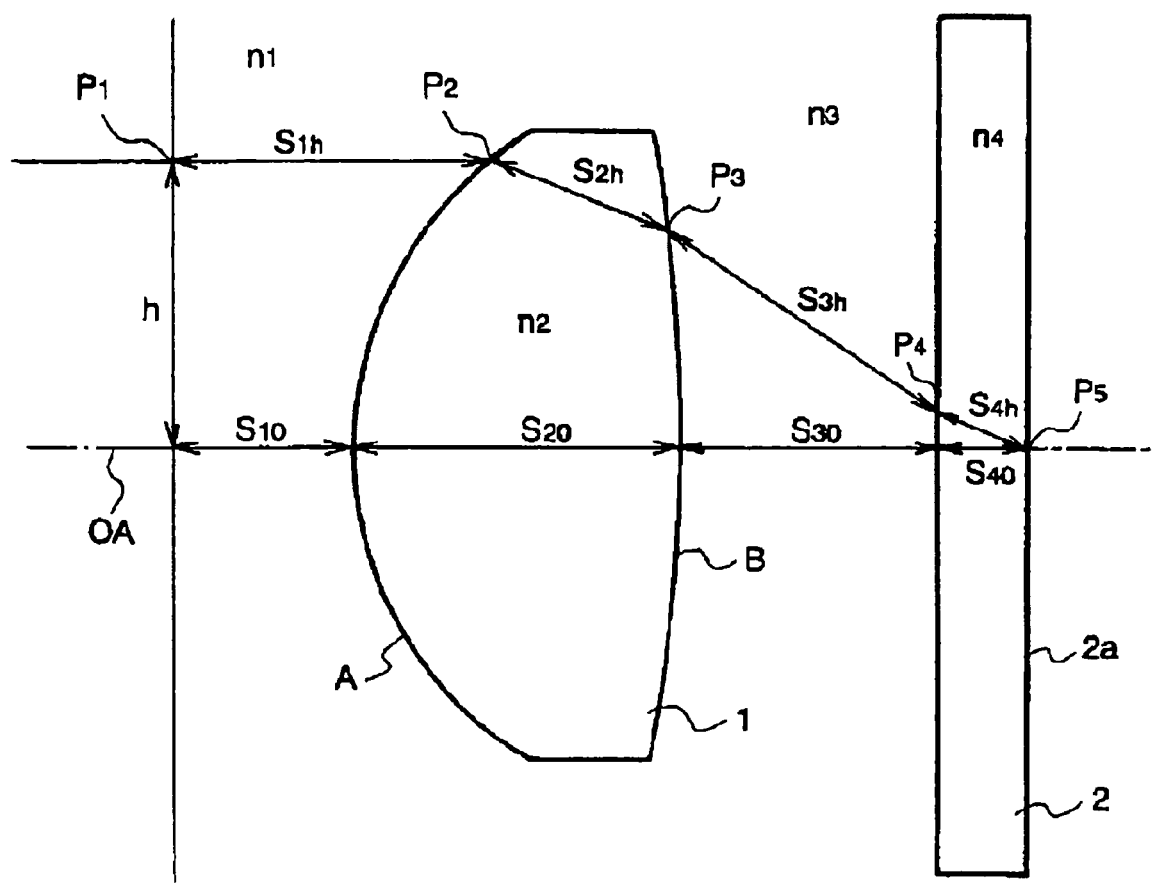
FIG. 3 is a view to explain an optical path length in a optical system having an objective lens and a transparent substrate of an optical disk.

In FIG. 3, a laser beam entering the objective lens $1$ is parallel light (thus, the optical system shown in FIG. 3 is a so-called infinite optical system), and there is schematically shown a light path of a light beam starting from the optical axis OA of the objective lens $1$, passing through a point $P_1$ located vertically h distant (light height) apart from the optical axis OA, and reaching a point $P_5$ where it crosses with the optical axis OA (a condensing point). Here, where an incident point to the objective lens $1$ on the light path is $P_2$, and an output point from the objective lens $1$ is $P_3$, and an incident point to the transparent substrate $2$ is $P_4$, and The point $P_1$~The incident point $P_2$:
Clearance=$S_{1h}$, Refractive index=$n_1$
The incident point $P_2$~The output point $P_3$:
Clearance=$S_{2h}$, Refractive index=$n_2$
The output point $P_3$~The incident point $P_4$:
Clearance=$S_{3h}$, Refractive index=$n_3$
The incident point $P_4$~The condensing point $P_5$:
Clearance=$S_{4h}$, Refractive index=$n_4$ an optical path length $L_h$ from the point $P_1$ to the condensing point $P_5$ is expressed by the following:

$$L_h=n_1\times S_{1h}+n_2\times S_{2h}+n_3\times S_{3h}+n_4\times S_{4h}\qquad\text{Formula 3:}$$

The optical path length $L_h$ on the optical axis OA is when h=0 in Formula 3.

Formula 3 is applicable to any light height h. When aberration is corrected, the condensing point $P_5$ for each light height h is on the information surface $2a$ within allowable ranges. The present invention uses a laser beam having different wavelengths respectively for each of substrates having different thickness; therefore, the spherical aberration and the chromatic aberration cancel each other out so that the condensing point $P_5$ for each light height h is on the information surface $2a$ within each of the allowable ranges.

A technique of sectioning an area of a lens surface where both the wavelengths are used in common, into a plurality of aspherical zones when using a monochromatic light $\lambda_1$ of 790 nm wavelength for CD and a monochromatic light $\lambda_2$ of 655 nm wavelength for DVD, for example, is as follows. According to the technique, optical path length of one aspherical zone differs from that of another by integral multiple of the wavelength $\lambda i$ of each of the monochromatic light. Further, the difference between a maximum value and a minimum value of wavefront aberration for each of the monochromatic light in each of the aspherical zones is $\Delta V_d(\lambda_1)$ and $\Delta V_d(\lambda_2)$ where d is an integral number of 1, 2 . . . , meaning each aspherical zone. With those conditions, ratio between the differences of each of the monochromatic light is between 0.4 and 2.5, preferably between 0.5 and 2.0, in any aspherical zone, thus producing the RMS wavefront aberration of a whole lens within the allowable range for both the wavelengths. When the optical path length, when the light height h=0, is $L_0$, and the optical path length of each light height is $L_h$, the wavefront aberration $V_h$ is expressed by the following formula:

$$V_h=(L_h-L_0)/\lambda i\qquad\text{Formula 4:}$$

Figure 10:
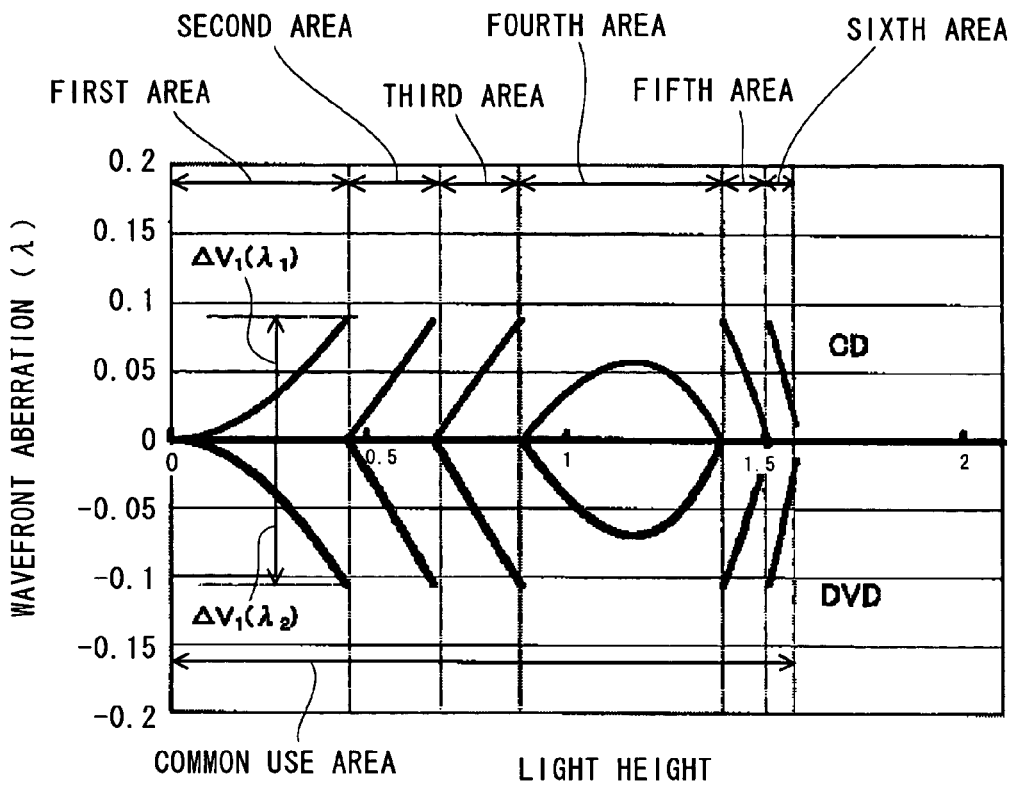
FIG. 10 shows the wavefront aberration for each wavelength with respect to light height.

FIG. 10 schematically shows comparisons between the wavefront aberrations by a lens for CD wavelength and those for DVD wavelength. In FIG. 10, the horizontal axis shows light height, and the vertical axis shows wavelength aberration, and the upper half shows wavefront aberration in each aspherical zone for a CD, and the lower half shows wavefront aberration in each aspherical zone for a DVD as calculated by the above formula. For example, in the first area of the aspherical zone, the difference between the maximum value and the minimum value of the wavefront aberration within the aspherical zone is defined as $\Delta V_d(\lambda_1)$ and $\Delta V_d(\lambda_2)$. As obvious from a later embodiment, according to a specific embodiment of the present invention, ratio of the differences falls in the range of 0.4 through 2.5 in any aspherical zone. Namely, in the present invention, each aspherical zone has uniform distribution of the wavefront aberration for any wavelength, which is different from conventional techniques configuring a lens surface based on one wavelength and correcting wavefront aberration in the other wavelength using phase lag. The integral multiple in the common use area is preferably in the range between 0 and ±10, and more preferably in between 0 and ±5, provided that the multiple number in at least adjacent aspherical zones is not 0.

A multi-wavelength lens according to the present invention is capable of obtaining more suitable optical properties in each wavelength by setting the difference between the maximum value and the minimum value of the wavefront aberration for each wavelength to be no more than 0.14 $\lambda i$ (for example, no more than 110.6 nm for 790 nm wavelength, and 91.7 nm for 655 nm wavelength), preferably no more than 0.12 $\lambda i$, and more preferably no more than 0.10 $\lambda i$, in each area of any aspherical zones.

Further, according to the present invention, when a multi-wavelength lens on which the wavefront aberration for each wavelength becomes approximate symmetric figures is employed in a dual wavelengths optical system, two wavelengths are well balanced, thereby further reducing the RMS wavefront aberration.

Regarding the reduction of RMS wavefront aberration, the RMS wavefront aberration for a CD is determined by the wavefront aberration only in a common use area for a DVD and CD which is up to 1.58 mm light height in FIG. 10. On the other hand, there is a DVD sole use area (the range of 1.58 to 2.02 mm light height in FIG. 10) outside of the common use area, and the RMS wavefront aberration for a DVD is determined by the wavefront aberration both in the common use area and in the sole use area. Therefore, in a case of the DVD, even if the wavefront aberration in the common use area is little too large, by correcting the wavefront aberration for the DVD in complete disregard for those for the CD in the DVD sole use area, it is possible to sufficiently reduce the RMS wavefront aberration for the DVD to fall in the allowable range. For instance, in the diagram shown in FIG. 10, in the common use area for the DVD and CD, the wavefront aberration for the DVD is 0 to −0.106 □, and that for the CD is 0 to +0.088, which is, the wavefront aberration for the CD is smaller than that for the DVD. The wavefront aberration in the DVD sole use area is −0.052 λ. The RMS wavefront aberration for the DVD is thus 0.0212 λRMS, and that for the CD is 0.0222 λRMS; therefore, the RMS wavefront aberrations for the DVD and for the CD are approximately equal. In this manner, in order to produce the same RMS wavefront aberrations for the DVD and CD, it is effective to make the wavefront aberration for the CD smaller than that for the DVD in the DVD and CD common use area, and then adjust the RMS wavefront aberration for the DVD by reducing the aberration in the DVD sole use area. Likewise, for producing the RMS wavefront aberrations of the different ratio between the DVD and CD, it should be counted that the wavefront aberration for the DVD can be reduced in the sole use area even when the aberration generated in the common use area is little too large.

This invention is also effective in a case where the substrate thickness of optical discs are not different, such as AOD (405 nm in wavelength and 0.6 mm in substrate thickness) and DVD (655 nm in wavelength and 0.6 mm in substrate thickness).

The above embodiment of the present invention makes it possible to form appropriate optical spots on the information surface for any types of the optical discs provided with the substrates having different thickness. The present invention is applicable to a case where the disc substrates do not have different thickness, which is, a case with the same substrate thickness and different wavelengths, by making the condensing points $P_5$ respectively fall within allowable ranges. Further, the present invention is not limited to be applied to optical storage medium, but also applicable to a case where laser beams having different wavelengths are passed through a single lens or optical system for optical communication.

In the following, preferred embodiments of the present invention will be explained with reference to the accompanying drawings, taking two types of optical discs provided with transparent substrates having different thickness, that are, DVD and CD, as an example. A lens according to the first embodiment of the present invention is made by forming resin made of amorphous polyolefin by injection molding because it is simple in manufacturing. A lens according to the second embodiment has a refractive index of glass, and it can have a refractive index of plastic resin when lens material is plastic resin.

Figure 1B:
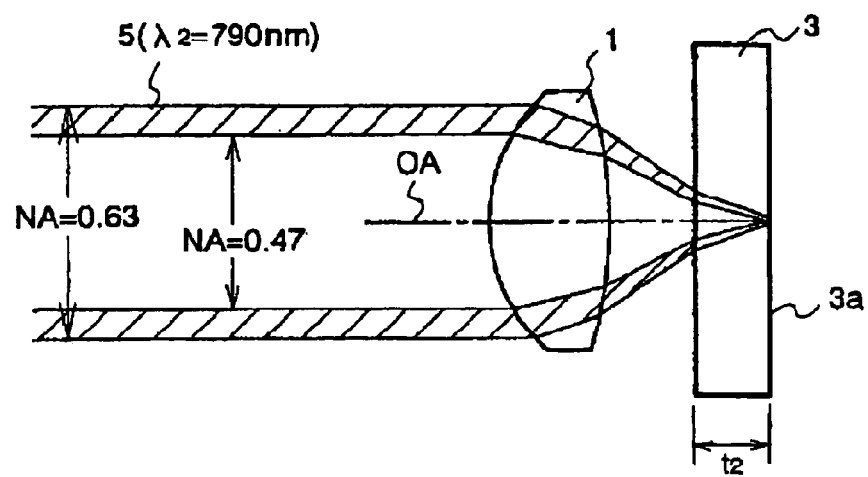

FIGS. 1A and 1B are diagrams to show the first embodiment of an objective lens according to the present invention, and FIG. 1A is for DVD, and FIG. 1B is for CD. In FIGS. 1A and 1B, reference symbol 1 denotes an objective lens according to the present embodiment, 2 denotes a transparent substrate of a DVD (which will be hereinafter referred to as DVD substrate), 3 denotes a transparent substrate of CD (CD substrate), and 4 and 5 denote laser beams.

In FIG. 1A, the optical lens 1 is mounted in an optical head (not shown) of an optical disc apparatus. A DVD is installed in the optical disc apparatus, and the objective lens 1 condenses the laser beam 4 as a parallel light, thereby processing recording or reproducing. Here, the DVD substrate 2 has the thickness $t_1$ of 0.6 mm, and the laser beam 4 has wavelength $\lambda_1$=655 nm, being a luminous flux having numerical aperture (NA)=0.63. Under such conditions, the laser beam is condensed on the information surface 2a formed on the DVD substrate 2 on the reverse of the side facing the objective lens 1.

FIG. 1B shows a case installing a CD in the same optical disc apparatus as above, and processing recording and reproducing using the same objective lens 1. Here, the CD substrate 3 has the thickness $t_2$ of 1.2 mm. Though the laser beam 5 has wavelength $\lambda_2$=790 nm, being a luminous flux having numerical aperture (NA)=approximately 0.63, luminous flux of NA=0.47 is substantially condensed on the information surface 3a on the CD substrate 3, and luminous flux of NA=approximately 0.47 to 0.63 shown by hatching which goes through a path apart from an optical axis OA of the objective lens is not condensed on the information surface 3a. The lens area where NA is approximately up to 0.47 is thus a common use area for the DVD and CD.

As explained above, in order to reduce the aberrations for both DVD and CD so as to produce appropriate optical spots on the information surfaces 2a and 3a, the first embodiment configures a lens surface of the objective lens 1 so that optical path length $L_h$ expressed by Formula 5 has a value within the allowable range for any light height h in both cases for DVD and CD. An example of such lens surface structure will be explained hereinafter with reference to FIG. 2.

Figure 2:
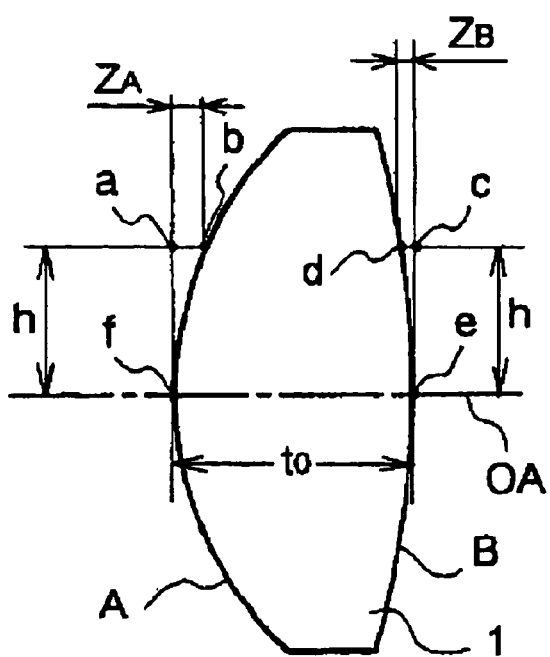
FIG. 2 is shows an example of a lens surface structure according to the first embodiment shown in FIG. 1.

In FIG. 2, for a light output side B of the objective lens 1, a point at light height h is c, and a point on the light output side B parallel to the optical axis OA from the point c is d. The surface structure of the light output side B is expressed with a distance $Z_B$ between the points c and d for any light height h by the following formula:

$$Z_B = \frac{C h^2}{1 + \sqrt{1 - (K+1) C^2 \cdot h^2}} + A_4 \cdot h^4 + A_6 \cdot h^6 + A_8 \cdot h^8 + A_{10} \cdot h^{10} \quad \text{Formula 5}$$

where C=−0.12301, K=3.312138, $A_4$=0.01628151, $A_6$=−0.004311717, $A_8$=0.000682316, and $A_{10}$=−0.00004157469.

Substitution of numeral values into the above factor C, K, $A_4$, $A_6$, $A_8$, and $A_{10}$ in Formula 5 gives a value of the distance $Z_B$ for any light height h ($\neq$0) as negative, which means that the point d on the light output side B is positioned closer to the input side (left side in FIG. 2) compared with the point c, that is, a surface apex e of the light output side B through which the optical axis OA passes. On the contrary, when the distance $Z_B$ is a positive value, it means that the point d is positioned at the right side of the point e.

Now, for a light incident side A of the objective lens 1, a point at light height h is a, and a point on the light incident side A parallel to the optical axis OA from the point a is b. The lens surface of the light incident side A is configured so that the light height h (mm) and a distance $Z_A$ (mm) between the points a and b for the light height h have relations as shown in the following table:

TABLE 1

| h(mm) | ZA(mm) |
|---|---|
| 0.00 | 0.000000 |
| 0.02 | 0.000095 |
| 0.04 | 0.000378 |
| 0.06 | 0.000851 |
| 0.08 | 0.001513 |
| 0.10 | 0.002365 |
| 0.12 | 0.003405 |
| 0.14 | 0.004635 |
| 0.16 | 0.006055 |
| 0.18 | 0.007664 |
| 0.20 | 0.009462 |
| 0.22 | 0.011451 |
| 0.24 | 0.013629 |
| 0.26 | 0.015998 |
| 0.28 | 0.018557 |
| 0.30 | 0.021308 |
| 0.32 | 0.024249 |
| 0.34 | 0.027382 |
| 0.36 | 0.030707 |
| 0.38 | 0.034224 |
| 0.40 | 0.037934 |
| 0.42 | 0.041838 |
| 0.44 | 0.045936 |
| 0.46 | 0.050229 |

TABLE 1-continued

| h(mm) | ZA(mm) |
|---|---|
| 0.48 | 0.054718 |
| 0.50 | 0.059403 |
| 0.52 | 0.065640 |
| 0.54 | 0.070725 |
| 0.56 | 0.076008 |
| 0.58 | 0.081490 |
| 0.60 | 0.087172 |
| 0.62 | 0.093056 |
| 0.64 | 0.099141 |
| 0.66 | 0.105429 |
| 0.68 | 0.111921 |
| 0.70 | 0.118619 |
| 0.72 | 0.125522 |
| 0.74 | 0.132634 |
| 0.76 | 0.139954 |
| 0.78 | 0.148855 |
| 0.80 | 0.156597 |
| 0.82 | 0.164550 |
| 0.84 | 0.172714 |
| 0.86 | 0.181092 |
| 0.88 | 0.189684 |
| 0.90 | 0.198492 |
| 0.92 | 0.207517 |
| 0.94 | 0.216760 |
| 0.96 | 0.226225 |
| 0.98 | 0.235911 |
| 1.00 | 0.245821 |
| 1.02 | 0.255956 |
| 1.04 | 0.266319 |
| 1.06 | 0.276910 |
| 1.08 | 0.287733 |
| 1.10 | 0.298787 |
| 1.12 | 0.310076 |
| 1.14 | 0.321601 |
| 1.16 | 0.333364 |
| 1.18 | 0.345367 |
| 1.20 | 0.357611 |
| 1.22 | 0.370098 |
| 1.24 | 0.382830 |
| 1.26 | 0.395809 |
| 1.28 | 0.409037 |
| 1.30 | 0.422515 |
| 1.32 | 0.436245 |
| 1.34 | 0.450229 |
| 1.36 | 0.463024 |
| 1.38 | 0.477531 |
| 1.40 | 0.492299 |
| 1.42 | 0.507330 |
| 1.44 | 0.522625 |
| 1.46 | 0.538186 |
| 1.48 | 0.552559 |
| 1.50 | 0.568667 |
| 1.52 | 0.585050 |
| 1.54 | 0.600234 |
| 1.56 | 0.617173 |
| 1.58 | 0.634395 |
| 1.60 | 0.653186 |
| 1.62 | 0.670934 |
| 1.64 | 0.688969 |
| 1.66 | 0.707293 |
| 1.68 | 0.725908 |
| 1.70 | 0.744816 |
| 1.72 | 0.764020 |
| 1.74 | 0.783521 |
| 1.76 | 0.803322 |
| 1.78 | 0.823424 |
| 1.80 | 0.843830 |
| 1.82 | 0.864540 |
| 1.84 | 0.885559 |
| 1.86 | 0.906886 |
| 1.88 | 0.928525 |
| 1.90 | 0.950477 |
| 1.92 | 0.972744 |
| 1.94 | 0.995329 |
| 1.96 | 1.018233 |
| 1.98 | 1.041459 |
| 2.00 | 1.065009 |
| 2.02 | 1.088887 |
| 2.04 | 1.113094 |
| 2.06 | 1.137635 |
| 2.08 | 1.162512 |
| 2.10 | 1.187732 |
| 2.12 | 1.213298 |

The light output side B of the objective lens 1 as expressed by Formula 5 and the light incident side A as shown in sequence data of Table 1 both have continuous aspherical surfaces. Also, the distance between the surface apexes f and e on the optical axis of the objective lens 1, that is, center thickness $t_0$, is 2.2 mm. The refractive index n for wavelength $\lambda_1$=655 nm (DVD) is 1.54014, and the refractive index n for wavelength $\lambda_2$=790 nm (CD) is 1.5365.

(i) Here, an allowable value for the aberration for evaluation is the RMS wavefront aberration of 0.035 $\lambda$, preferably 0.033 $\lambda$, and more preferably 0.030 $\lambda$ for both DVD (wavelength $\lambda_1$=655 nm) and CD (wavelength $\lambda_2$=790 nm) when an incident laser beam into the objective lens 1 has the incident angle of 0°, which is, when it is a parallel light to the optical axis OA. In the first embodiment, the light output side B and light incident side A are designed to have the above surface structure so that the wavefront aberrations for the DVD and CD are under such allowable value.

While the first embodiment describes a case using two kinds of different wavelengths $\lambda_1$ and $\lambda_2$, it is the same in a case using n kinds (n is an integral number of 2 and above) of different wavelengths $\lambda i$ (i=1, 2, . . . n).

(ii) In a case using n kinds of wavelength $\lambda i$, when each of the RMS wavefront aberration, where an incident laser beam of the wavelength $\lambda i$ has the incident angle of 0° is Wi·$\lambda i$, the aberration satisfies the following formula:

$$\sqrt{(\Sigma Wi^2)/i} \leq W_0 \qquad \text{Formula 6:}$$

where the wavelength of i-th light beam is $\lambda i$ (i=1, 2, . . . ), sum of square of each RMS wavefront aberration for all the wavelengths is $\Sigma Wi^2$, and the RMS wavefront aberration of light beam having wavelength $\lambda i$ is Wi·$\lambda i$. The allowable value $W_0$ here is 0.028, preferably 0.026, and more preferably 0.025, further preferably 0.023. In the first embodiment where the RMS wavefront aberration for a DVD is $W_1$, that for a CD is $W_2$, and i=1, 2, the Formula 6 becomes as follows:

$$\sqrt{(W_1^2+W_2^2)/2} \leq W_0 \qquad \text{Formula 7:}$$

(iii) In a case using laser beams having n kinds of different wavelengths $\lambda i$, when the maximum RMS wavefront aberration is $W_{max}$ and the minimum RMS wavefront aberration is $W_{min}$, of the n kinds of different wavelength $\lambda i$, it satisfies the following formula:

$$1 \leq W_{max}/W_{min} < W_{th}$$

The allowable value $W_{th}$ in this case is 1.8, preferably 1.6, and more preferably 1.4. In the case of the first embodiment, one of the RMS wavefront aberrations $W_1$ for a DVD and the RMS wavefront aberration $W_2$ for a CD is the maximum RMS wavefront aberration $W_{max}$, and the other is the minimum RMS wavefront aberration $W_{min}$.

Figure 4A:
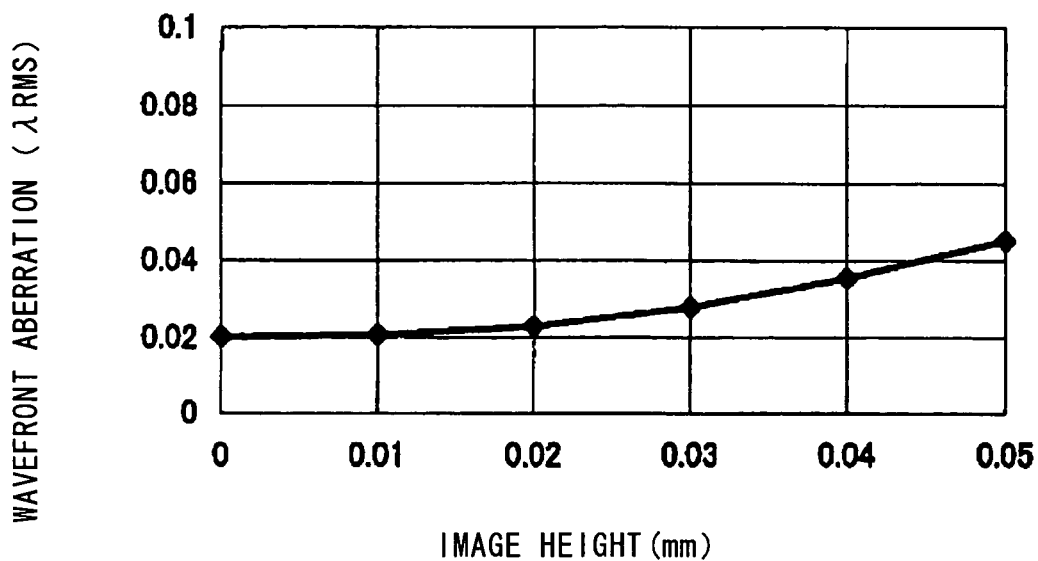
FIGS. 4A and 4B show an example of a measurement result of wavefront aberration according to the first embodiment shown in FIG. 1.
Figure 4B:
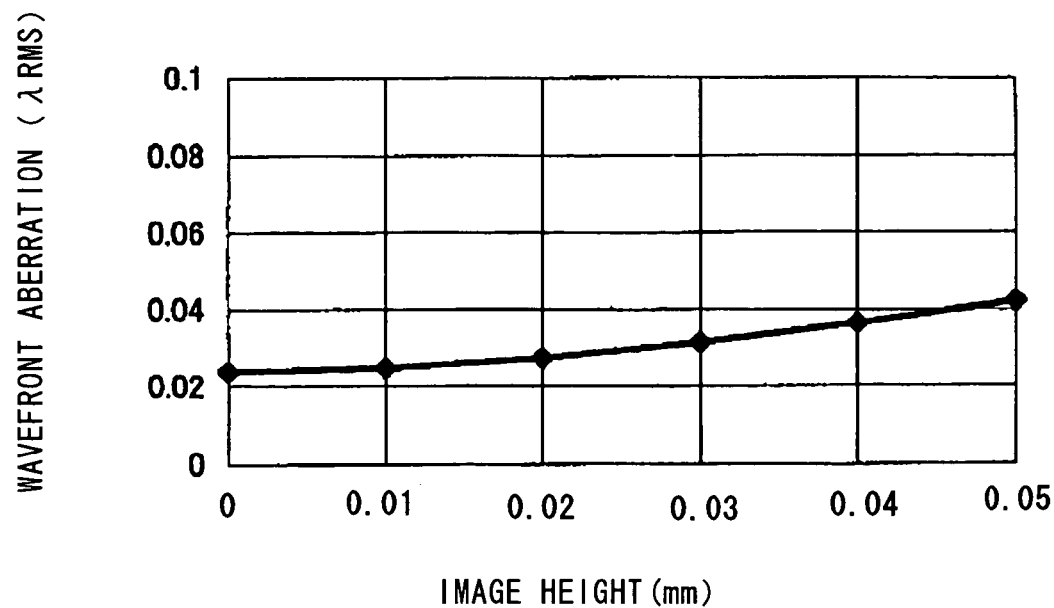

FIGS. 4A and 4B show calculation results regarding the RMS wavefront aberration in the first embodiment. In the graph shown in FIGS. 4A and 4B, the horizontal axis is image height (mm), and the vertical axis is RMS wavefront aberration.

FIG. 4A shows the RMS wavefront aberration for a DVD (wavelength $\lambda_1=655$ nm), and when the image height is 0 mm, the RMS wavefront aberration is $0.02130 \lambda_1$. FIG. 4B shows the RMS wavefront aberration for a CD (wavelength $\lambda_2=790$ nm), and when the image height is 0 mm, the RMS wavefront aberration is $0.02410 \lambda_2$.

The above values are now substituted into each of the above formulas for the evaluation. The results are as follows:

(i) First, for the DVD and CD, the RMS wavefront aberrations are respectively $0.02130 \lambda$ and $0.02410 \lambda$, which are smaller than the allowable values of $0.035 \lambda$, $0.033 \lambda$, or $0.030 \lambda$.

(ii) For the DVD and CD, from the Formula 7, $$\sqrt{(W_1^2 + W_2^2)/2} = \sqrt{(0.02130^2 + 0.02410^2)/2} = 0.02274 \qquad \text{Formula 8}$$

therefore, the value given is under the allowable value of 0.028 (or preferably 0.026, 0.025, or 0.023).

(iii) For the DVD and CD, $W_{max}/W_{min}$ is given as follows.

$$W_{max}/W_{min} = 0.02410/0.02130 = 1.1315$$

Accordingly, it is under the allowable value of 1.8, 1.6. or 1.4.

Figure 5A:
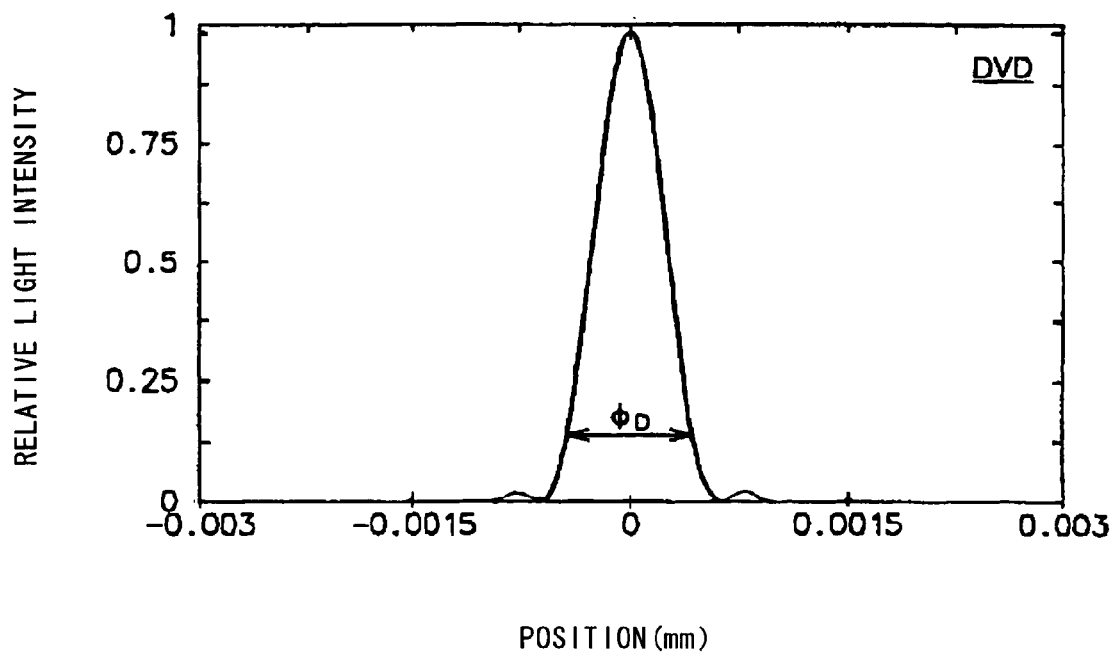
FIGS. 5A and 5B show a calculation result of optical spots for different types of optical discs in an optical disc apparatus employing the first embodiment shown in FIG. 1.
Figure 5B:
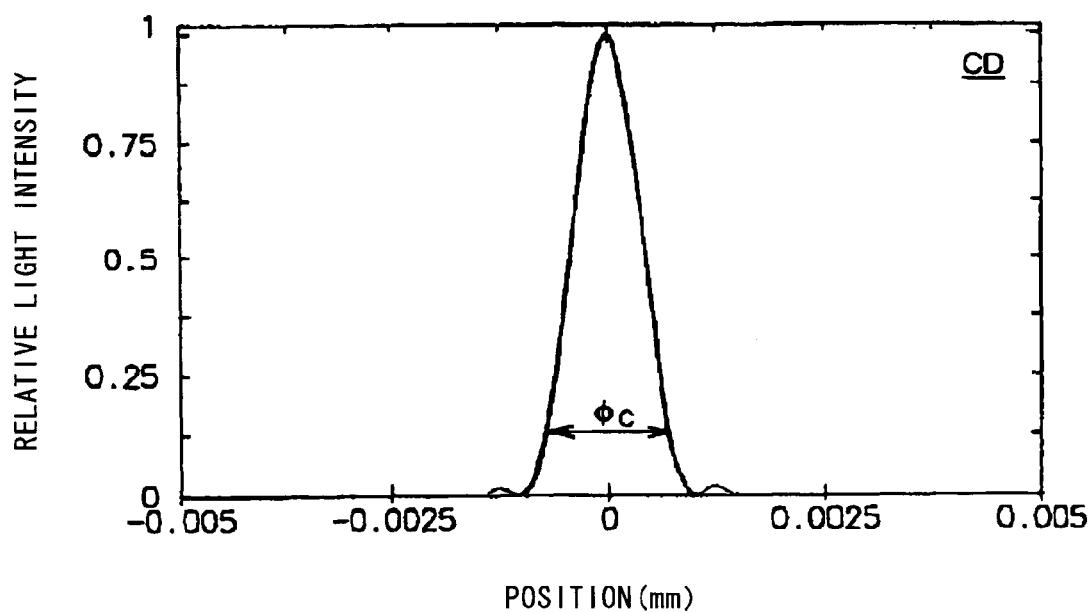

FIGS. 5A and 5B show calculation results regarding optical spots on the information surfaces of the DVD and CD when using the objective lens 1 provided with the light output side B having the surface structure expressed by Formula 5, and the light incident side A having the surface structure shown in Table 1. In FIGS. 5A and 5B, the horizontal axis shows a position in a vertical direction expressed by the distance (mm) from the reference point where the optical axis is on the information surface, and the vertical axis shows a relative light intensity in each position when a light intensity at the reference point ($=0$ mm) is 1.

FIG. 5A shows optical spots for a DVD, and an optical spot with the relative light intensity of $1/e^2 (=13.5\%)$ has a diameter $\phi D$ of 0.85 μm. FIG. 5B shows optical spots for a CD, and an optical spot with the relative light intensity of $1/e_2$ has a diameter $\phi C$ of 1.37 μm. Thus, both for the DVD and CD, optical spots are appropriately produced on the information surface.

Now, the second embodiment of the objective lens according to the present invention will explained herein below.

In the second embodiment whose basic structure is the same as the first embodiment, the light incident side A is radially sectioned into a plurality of zones from the optical axis, and each zone surface is configured so that the aberrations for both DVD and CD are reduced to fall within the allowable value.

The surface structure of the light incident side A according to the second embodiment will be explained hereinafter with reference to FIG. 2. The distance between the points a and b in a j-th zone from the optical axis OA in the direction of the light height h (in the radial direction) on the light incident side A is expressed by the following function $Z_{Aj}$ $$Z_{Aj} = B + \frac{C h^2}{1 + \sqrt{1 - (K+1) C^2 \cdot h^2}} + A_4 \cdot h^4 + A_6 \cdot h^6 + \\ A_8 \cdot h^8 + A_{10} \cdot h^{10} + A_{12} \cdot h^{12} + A_{14} \cdot h^{14} + A_{16} \cdot h^{16} \qquad \text{Formula 9}$$

The light height h in Formula 9 is that in the j-th zone.

The following table shows the range of h and the constant B, C, K, $A_4$, $A_6$, $A_8$, $A_{10}$, $A_{12}$, $A_{14}$, and $A_{16}$ for each zone in Formula 9 to reduce the aberrations for both DVD and CD to be within the allowable value range.

TABLE 2

| j | h | B | C | K | A4 | A6 |
|---|---|---|---|---|----|----|
| 1 | 0~0.464667 | 0 | 4.45390E-01 | -6.67483 | 0.030017 | 1.026695 |
| 2 | 0.464667~0.687967 | 0.00108409 | 4.46999E-01 | -8.52884E-01 | -1.11390E-03 | 8.21580E-03 |
| 3 | 0.687967~0.904685 | 0.00216818 | 4.45826E-01 | -5.85171E-01 | 2.36910E-03 | -5.00360E-03 |
| 4 | 0.904685~1.414529 | 0.00325226 | 4.46759E-01 | -6.51167E-01 | 9.59140E-04 | 4.83750E-04 |
| 5 | 1.414529~1.519145 | 0.00216818 | 4.28660E-01 | -3.27869E-01 | 6.74850E-03 | 3.92010E-04 |
| 6 | 1.519145~1.589366 | 0.00108409 | 4.42061E-01 | -5.75461E-01 | 2.50970E-03 | 1.75070E-04 |
| 7 | 1.589366~1.847991 | 0.00103073 | 4.45481E-01 | -6.24870E-01 | 1.77360E-03 | 1.24130E-04 |
| 8 | 1.847991~2.2 | -0.00113744 | 4.45319E-01 | -6.13552E-01 | 1.64620E-03 | 1.15930E-04 |

| j | A8 | A10 | A12 | A14 | A16 |
|---|-----|------|------|------|------|
| 1 | -14.364412 | 106.233381 | -431.806672 | 895.812958 | -725.25403 |
| 2 | 9.75070E-03 | -3.03780E-02 | -4.03770E-02 | 1.80080E-01 | -1.49931E-01 |
| 3 | 4.59410E-03 | 3.04280E-03 | -8.16540E-03 | 6.55040E-03 | -2.40830E-03 |
| 4 | 2.53240E-04 | -1.24670E-04 | -1.01670E-04 | 7.59740E-05 | -1.37590E-05 |
| 5 | -1.18360E-03 | -4.24370E-04 | 7.93880E-05 | 1.45720E-04 | -3.75090E-05 |
| 6 | -2.24990E-04 | -1.73810E-05 | 6.71230E-07 | 1.64740E-05 | -3.96660E-06 |
| 7 | -7.34610E-05 | 2.76610E-05 | -9.44330E-06 | 1.32750E-06 | -6.17570E-08 |
| 8 | -7.50480E-05 | 2.80220E-05 | -9.53270E-06 | 1.33720E-06 | -6.23130E-08 |

The surface structure $Z_B$ of the light output side B according to the second embodiment is expressed by the following formula:

$$Z_B = \frac{C h^2}{1 + \sqrt{1 - (K+1) C^2 \cdot h^2}} + \\ A_4 \cdot h^4 + A_6 \cdot h^6 + A_8 \cdot h^8 + A_{10} \cdot h^{10} \qquad \text{Formula 10}$$

where, $C=-0.0747792$, $K=15.7398$, $A_4=0.012308$, $A_6=-0.0037652$, $A_8=0.00068571$, and $A_{10}=-0.000048284$.

The distance between the surface apexes f and e on the optical axis of the objective lens 1, which is, the center thickness $t_0$, is 2.2 mm. The refractive index n for wavelength $\lambda_1=655$ nm (DVD) is 1.604194, and the refractive index n for wavelength $\lambda_2=790$ nm (CD) is 1.599906.

The thickness and refractive index of a transparent substrate are: 0.6 mm and 1.57995 for wavelength $\lambda 1=655$ nm (DVD) and 1.2 mm and 1.573071 for $\lambda 1=790$ nm (CD). NA for DVD is 0.60 and NA for CD is 0.47. A focal distance for DVD is 3.360 mm and that for CD is 3.383 mm. The diaphragm of incident parallel light beam is placed, though not shown, only for DVD, and the diaphragm diameter is φ4.032, given by: 2×NA×focal distance. The diaphragm diameter remains φ4.032 for CD also. Hence, the light of φ4.032 enters despite that the use area for CD on the light incident surface is φ3.178732, which is Zones 1 to 6 of the DVD/CD common use area. Light beams thereby enter the area between φ3.178732 and φ4.032 when using CD, in spite of its being a DVD sole use area. It is thus necessary to prevent the light beams incident on this area from having harmful effect when using CD. The optical spot graph in FIG. 7B indicates no harmful effect produced.

Here, the allowable value for the aberration for evaluation is the same as the first embodiment.

Figure 6A:
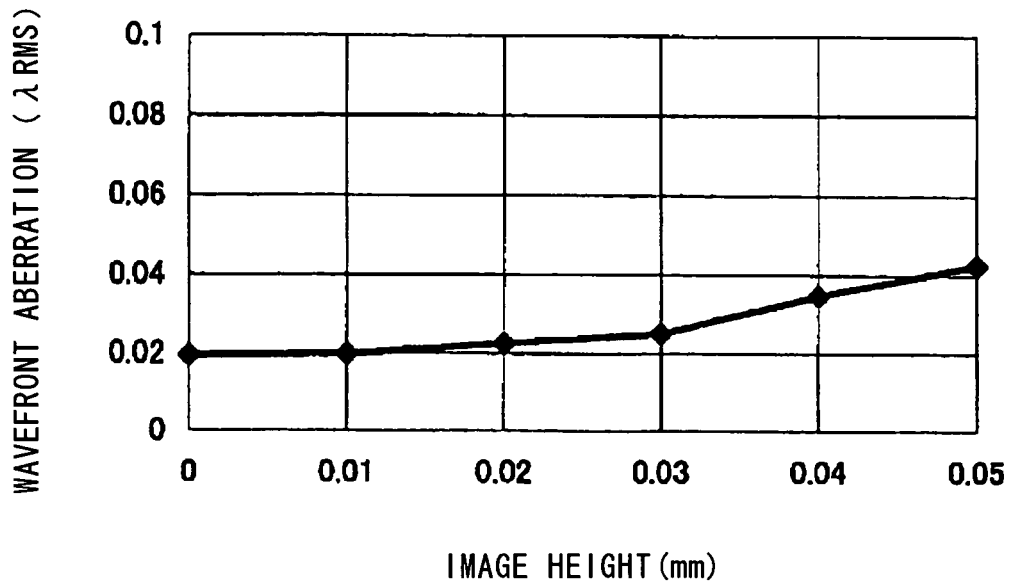
FIGS. 6A and 6B show an example of a measurement result of wavefront aberration in an objective lens according to the second embodiment of the present invention.
Figure 6B:
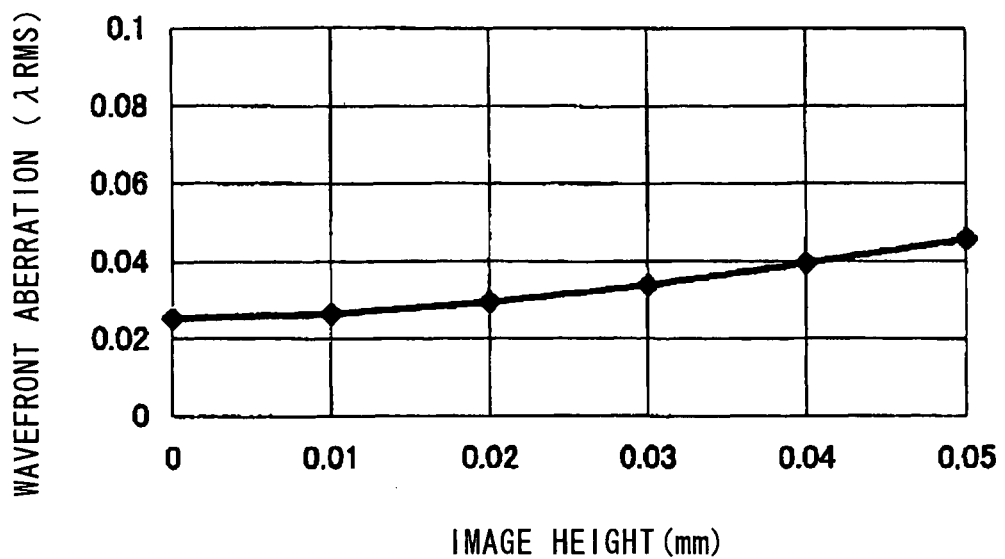

FIGS. 6A and 6B show calculation results regarding the RMS wavefront aberration in the second embodiment. In the graph, the horizontal axis and vertical axis are the same as FIGS. 4A and 4B.

FIG. 6A shows the RMS wavefront aberration for a DVD (wavelength $\lambda_1$=655 nm), and when the image height is 0 mm, the RMS wavefront aberration is 0.01945 $\lambda_1$. FIG. 6B shows the RMS wavefront aberration for a CD (wavelength $\lambda_2$=790 nm), and when the image height is 0 mm, the RMS wavefront aberration is 0.02525 $\lambda_2$.

Figure 11:
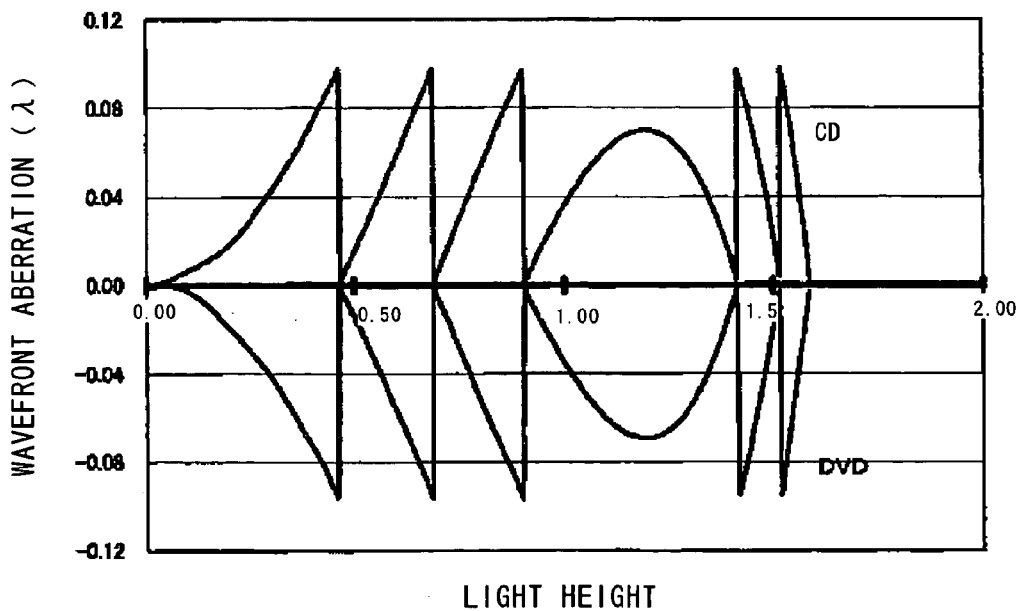
FIG. 11 shows the wavefront aberration for each wavelength with respect to light height in the second embodiment.

FIG. 11 shows a calculation result regarding the wavefront aberration on the lens in the common use area. The following table shows the difference in the wavefront aberration and the ratio of the differences, in each of the aspherical zones:

TABLE 3

|  | Zone 1 | Zone 2 | Zone 3 | Zone 4 | Zone 5 | Zone 6 |
| --- | --- | --- | --- | --- | --- | --- |
| $\Delta V_d (\lambda 655) (\lambda)$ | 0.0955 | 0.0960 | 0.0963 | 0.0692 | 0.0939 | 0.0937 |
| $\Delta V_d (\lambda 790) (\lambda)$ | 0.0977 | 0.0973 | 0.0967 | 0.0701 | 0.0974 | 0.0976 |
| $\Delta V_d (\lambda 790)/ \Delta V_d (\lambda 655)$ | 1.02 | 1.01 | 1.00 | 1.01 | 1.04 | 1.04 |
| $\Delta V_d (\lambda 655)/ \Delta V_d (\lambda 790)$ | 0.98 | 0.99 | 1.00 | 0.99 | 0.96 | 0.96 |

As shown in Table 3, in the common use area of 790 nm and 655 nm, the ratio of the difference $\Delta V_d(\lambda 790)(\lambda)/\Delta V_d(\lambda 655)$ of each wavefront aberration falls in the range of 1.00 and 1.04. The ratio $\Delta V_d(\lambda 655)/\Delta V_d(\lambda 790)$ is in the range of 0.96 and 1.00. The difference of wavefront aberration itself in each area is no more than 0.14 λ in both wavelengths. In the lens, the wavefront aberration is produced at a positive side for 790 nm wavelength, and at a negative side for 655 nm wavelength; also, the wavefront aberrations become approximately symmetric.

Though the optical path lengths are different in adjacent aspherical zones sectioned centered on the optical axis, the differences are set to be integral multiple corresponding to each wavelength, and the lens surface is sectioned into even number of aspherical zones in this embodiment.

The above values are now substituted into each of the above formulas for the evaluation, as is the case with the first embodiment. The results are as follows:

(i) First, for the DVD and CD, the RMS wavefront aberrations are respectively 0.01945 λ1 and 0.02525 λ2, which are smaller than the allowable values of 0.035 λ, 0.033 λ, or 0.030 λ.

(ii) For DVD and CD, from the Formula 7, $$\sqrt{(W_1^2 + W_2^2)/2} = \sqrt{(0.01945^2 + 0.02525^2)/2} = 0.02254 \quad \text{Formula 11}$$

therefore, the value given is under the allowable value of 0.028, 0.026, 0.025, or 0.023.

(iii) For DVD and CD, $W_{max}/W_{min}$ is given as follows.

$$W_{max}/W_{min} = 0.02525/0.01945 = 1.298$$

Accordingly, it is does not exceed the allowable value of 1.8, 1.6, and even 1.4.

Figure 7A:
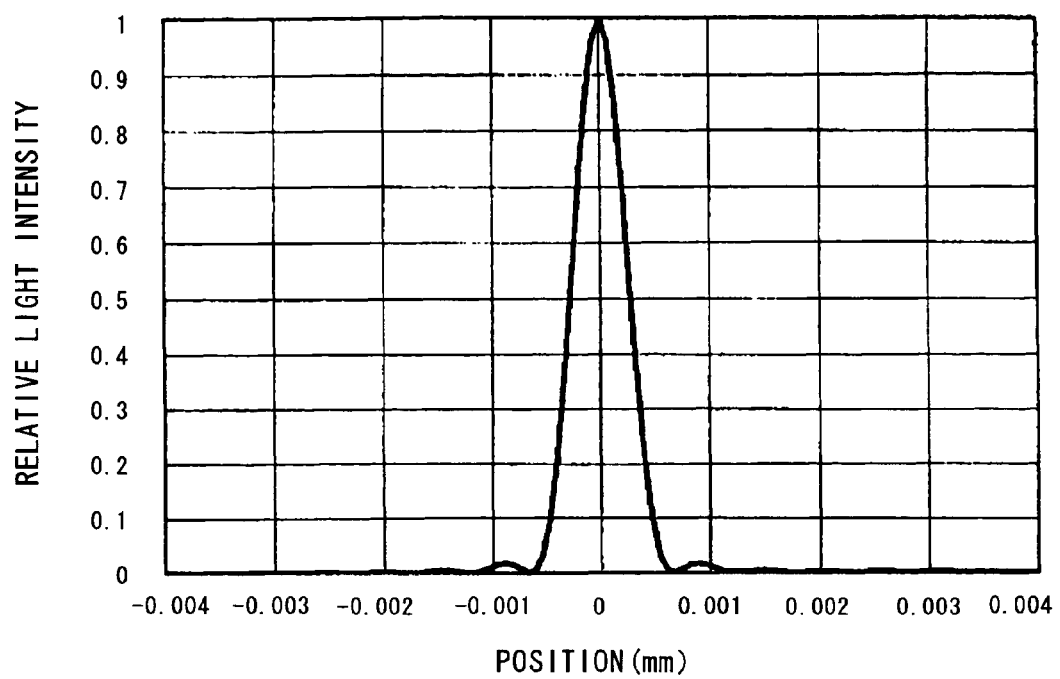
FIGS. 7A and 7B show a calculation result of optical spots for different types of optical discs in an optical disc apparatus employing the objective lens according to the second embodiment of the present invention.
Figure 7B:
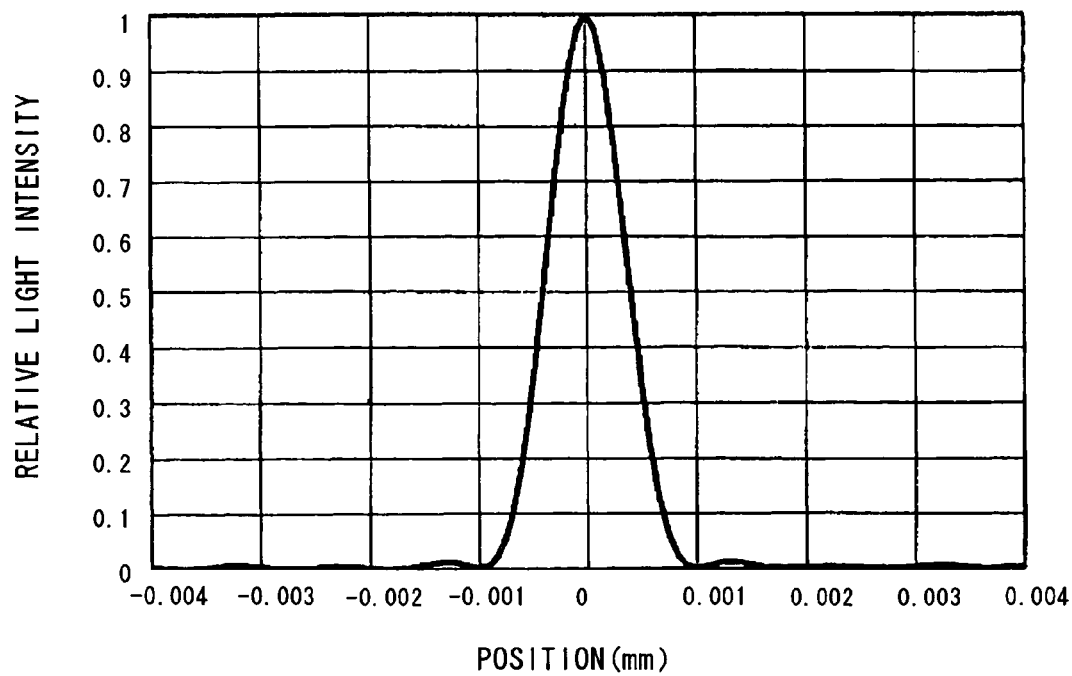

FIGS. 7A and 7B show calculation results for optical spots on the information surfaces of DVD and CD when using the objective lens 1 having the light output side B with the surface structure expressed by Formula 10 and the light incident side A with the surface structure expressed by Formula 9 and shown in Table 2. The horizontal axis and vertical axis of the graph are the same as in FIG. 5.

FIG. 7A shows optical spots for DVD, and an optical spot where the relative light intensity is $1/e^2$ (=13.5%) has a diameter φD of 0.89 μm. FIG. 7B shows optical spots for CD, and an optical spot where the relative light intensity is $1/e^2$ has a diameter φC of 1.30 μm. The light adjusted by the same diaphragm enters for both CD and DVD, and the diaphragm is set to such a range as to allow the light to enter both of the DVD/CD common use area and the DVD sole use area. As shown in FIGS. 7A and 7B, the optical spots are appropriately produced on the information surface for both DVD and CD.

Figure 22:
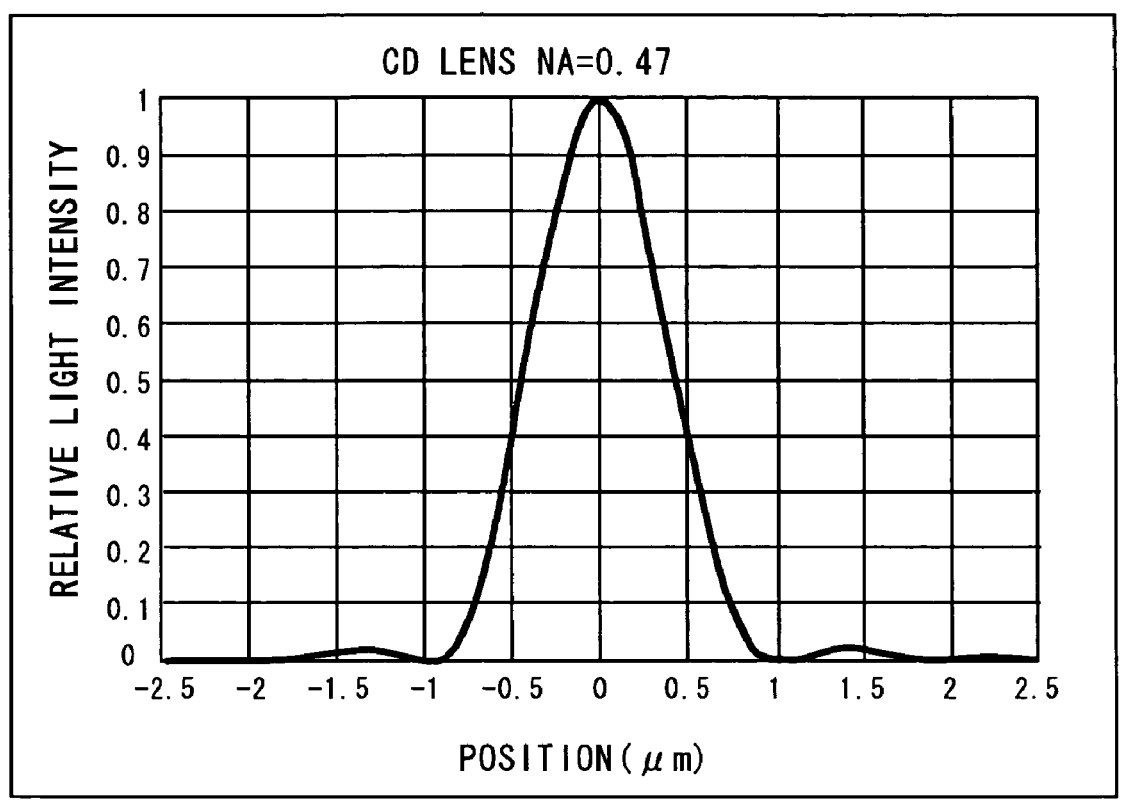
FIG. 22 shows an optical spot graph of a lens for CD.
Figure 23:
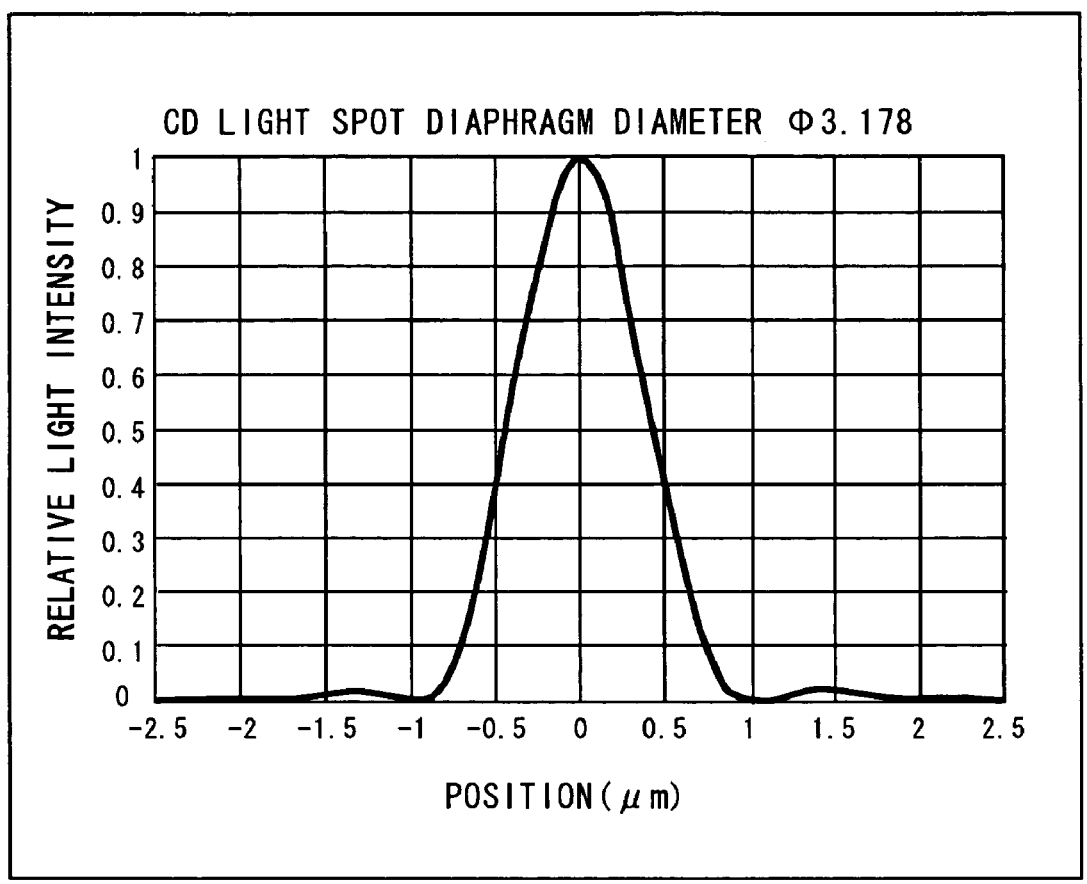
FIG. 23 is an optical spot graph of a lens where a diaphragm diameter is set according to the second embodiment of the present invention.

These optical spots are now compared with those produced by an almost perfect lens for CD generating wavefront aberration of 0.0000 λRMS and having the same NA, 0.47, as the lens in the second embodiment. FIG. 22 shows an optical spot diaphragm of this lens for CD. The diameter of the optical spot where the relative light intensity is $1/e^2$ (=13.5%) is 1.3804 μm. Thus, the optical spot for CD in the second embodiment is smaller than the optical spot when using an almost perfect normal lens for CD in spite of the same NA. The second embodiment, if focusing on CD, achieves a smaller optical spot for CD by providing the DVD sole use area in Zones 7 and 8 having a phase difference in wavefront aberration in addition to the original CD use area in Zones 1 to 6. The phase difference in wavefront aberration means that Zones 7 and 8, which are the DVD sole use area, have wavefront aberration of 2λ1 for wavelength 655 nm (DVD). In order to prove this, regarding the second embodiment, the CD optical spots only in Zones 1 to 6 are calculated while blocking Zones 7 and 8 by setting the diaphragm diameter to φ3.178. FIG. 23 shows the result. The diameter of the optical spot where the relative light intensity is $1/e^2$ shown in FIG. 23 is 1.3924 μm, which is 0.01 μm greater than the lens for CD shown in FIG. 22 and 0.09 μm greater than the lens for CD in the second embodiment shown in FIG. 7B. This indicates that, if a lens for wavelength λ2 is provide with, on its outer side, a use area for wavelength λ1 different from the wavelength λ2, which lets through light, and which preferably has a phase difference in wavefront aberration for the wavelength λ1, the optical spot diameter of the wavelength λ2 decreases compared to the case where the lens has no such a use area for wavelength λ1.

In the second embodiment, the ratio is 0.96 to 1.04 in Table 3, and the RMS wavefront aberration for the DVD is 0.01945 $\lambda_1$ and that for the CD is 0.02525 $\lambda_2$. However, it is possible to produce equal RMS wavefront aberrations of around 0.022 to 0.023 λ for the DVD and CD by increasing the aberration for the DVD while reducing that for the CD in the common use area, as explained above with reference to FIG. 10.

The RMS wavefront aberrations for a DVD and CD disclosed in Japanese Unexamined Patent Application Publication No. 2001-51192, for example, are as follows.

Example 1: DVD: 0.001 $\lambda_1$ CD: 0.047 $\lambda_2$
Example 2: DVD: 0.019 $\lambda_1$ CD: 0.037 $\lambda_2$
(λ1=640 nm, and λ2=780 nm)

Each of the above values is over the allowable value of 0.035 λ.

Figure 12:
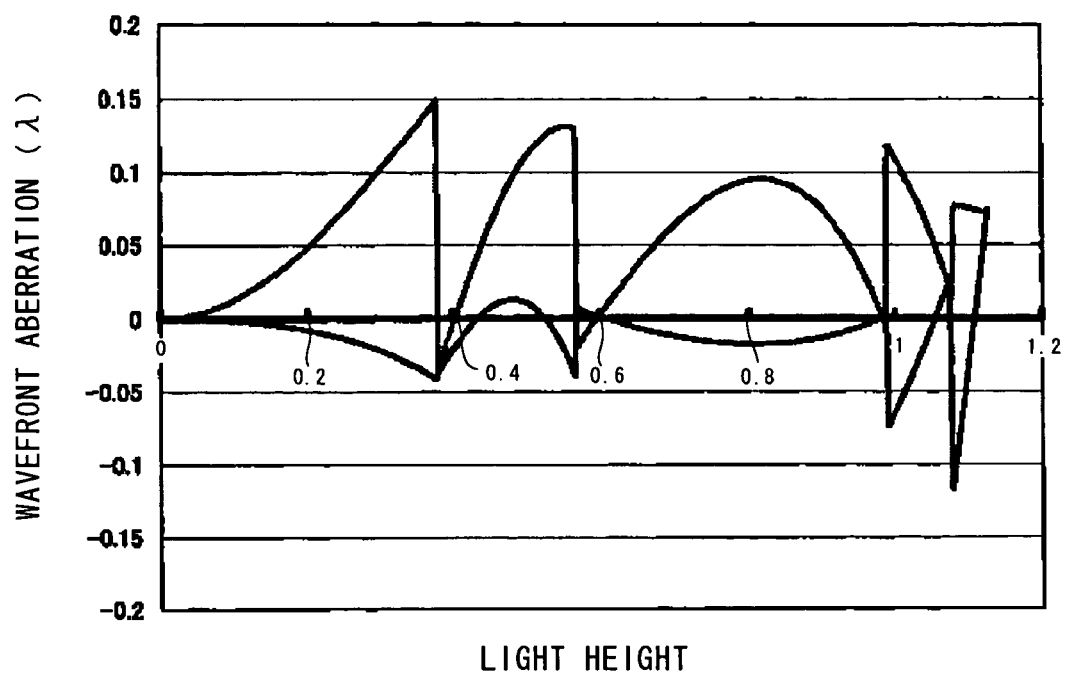
FIG. 12 shows the wavefront aberration for each wavelength with respect to light height when using a lens disclosed in Japanese Unexamined Patent Application Publication No. 2001-51192.
Figure 13:
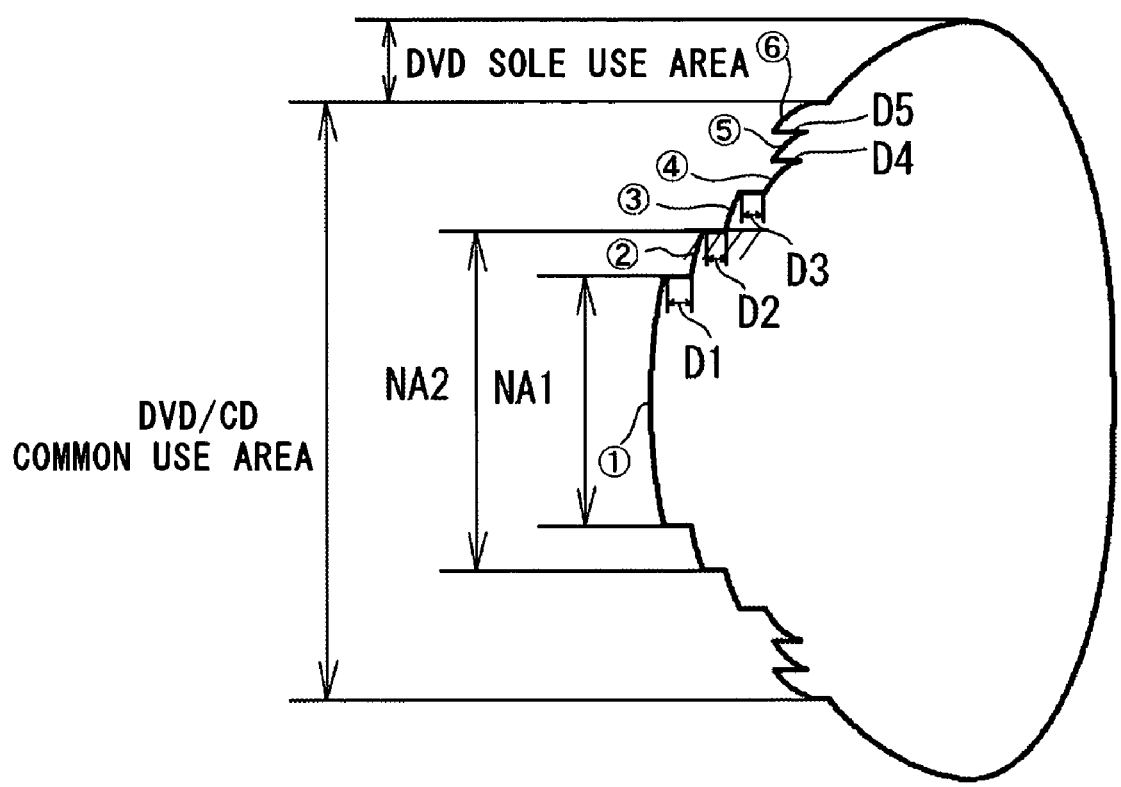
FIG. 13 is a view to explain a mathematical formula in the second embodiment of the present invention.

Besides, when calculating the wavefront aberration of lens for each wavelength in example 2 by using the lens data disclosed in the above application, as shown in the following table 4 and FIG. 12, the ratio of the difference, $\Delta V_d(\lambda 655)/V_d(\lambda 790)$ is 0.21 through 33.44 and $\Delta V_d(\lambda 790)(\lambda)/\lambda V_d(\lambda 655)$ is 0.03 through 4.72, which are outside of the limits set for the present invention, thus being out of balance. In addition, while the wavefront aberration produced for the DVD is no more than 0.14 $\lambda$, that for the CD are large, and therefore the RMS wavefront aberration of lens as a whole become large.

TABLE 4

|  | Zone 1 | Zone 2 | Zone 3 | Zone 4 | Zone 5 |
|---|---|---|---|---|---|
| $\Delta V_d (\lambda 655) (\lambda)$ | 0.0415 | 0.0518 | 0.0242 | 0.1012 | 0.1906 |
| $\Delta V_d (\lambda 790) (\lambda)$ | 0.1489 | 0.1635 | 0.1142 | 0.1039 | 0.0057 |
| $\Delta V_d (\lambda 655)/\Delta V_d (\lambda 790)$ | 0.28 | 0.32 | 0.21 | 0.97 | 33.44 |
| $\Delta V_d (\lambda 790)/\Delta V_d (\lambda 655)$ | 3.59 | 3.16 | 4.72 | 1.03 | 0.03 |

When the values are substituted into the following formula:

$$\sqrt{(W_1^2+W_2^2)/2} \qquad \text{Formula 12:}$$

it gives 0.0332 and 0.0294, respectively, for the above examples 1 and 2, both of which are over all the allowable values of 0.028, 0.026, 0.025, and 0.023. Further, the value of $W_{max}/W_{min}$ is 47 and 1.847, respectively, for the above examples 1 and 2, both which are over all the allowable values of 1.8, 1.6, and 1.4.

As explained in the foregoing, the first and second embodiments are capable of keeping the aberration within the allowable value because the lens surface has such a structure that spherical aberration generated by a difference in substrate thickness and chromatic aberration cancel each other out to bring the total aberration within the allowable value. On the other hand, the technique disclosed in Japanese Unexamined Patent Application Publication No. 2001-51192 reduces the aberration for a CD by phase-shifting the incident laser beam for integral multiple of the wavelength of the DVD laser beam. Though the technique is able to sufficiently reduce the aberration for either one of the wavelengths, it is unable to keep the aberration for all of the wavelengths at the same time within the allowable limit of such a small value.

It is obvious from the optical spots shown in FIGS. 5A, 5B, 7A, and 7B, and the wavefront aberration shown in the graphs in FIGS. 4A, 4B, 6A, and 6B that, in the above embodiment, the spherical aberration caused by a difference in substrate thickness between DVD and CD, which is, 0.6 mm and 1.2 mm respectively, are canceled by the chromatic aberration caused by a difference in wavelength, 655 nm and 790 nm respectively, to reduce the total aberration. Besides, in the embodiments, the objective lens 1 has the light incident side A whose surface structure is given by the sequence data in Table 1, Formula 9, and Table 2, and the light output side B whose surface structure is given by the aspherical surface formulas expressed by Formula 5 and 10, which is different from the diffractive lens surface as disclosed in the conventional technique. Further, the objective lens 1 is able to condense approximately all luminous flux for numerical aperture (NA) necessary for recordation or reproduction, thereby obtaining the high light use efficiency.

In the above embodiment, the outer area of the objective lens 1 having numerical aperture of approximately NA=0.47 to NA=0.63 is used only for a DVD, and not used for a CD, as shown in FIG. 1. Therefore, it is possible to form a thin film through which light of the 655 nm DVD wavelength passes and light of the 790 nm CD wavelength does not pass on either one or both of the light incident side A and the light output side B in the outer area. It is also possible to form a diffraction grating not acting on light of the 655 nm wavelength, but acting on light of the 790 nm wavelength on either one or both of the light incident side A and the light output side B in the outer area. In this structure, the light use efficiency for light having the 790 nm wavelength can be reduced without reducing the light use efficiency for light having the 655 nm wavelength.

When the present invention is applied to systems having different numerical apertures but not having the diaphragm according to the numerical apertures, the lens receives excess luminous flux in a system having smaller numerical aperture. Therefore, it is preferable to make arrangements such that the light passing through the outer area of the lens designed according to an optical system having larger numerical aperture does not have adverse effects on an optical system having smaller numerical aperture. For example, an amount of transverse aberration is preferably 0.015 mm and over.

Though the above embodiment has been given of the case using optical discs of two types, a DVD and CD, the present embodiment is not limited thereto, whereas it is applicable to the case using other optical discs of different types or optical discs of more than two types provided with substrates having different thickness. In these cases, laser beams are set to have different wavelengths, and a lens surface is configured so that chromatic aberration cancels wavefront aberration out according to the wavelength.

Further, the present invention is also effective in reducing aberration when applied to the case where substrate thickness is the same but wavelength is different, causing large aberration with conventional lens.

Figure 8:
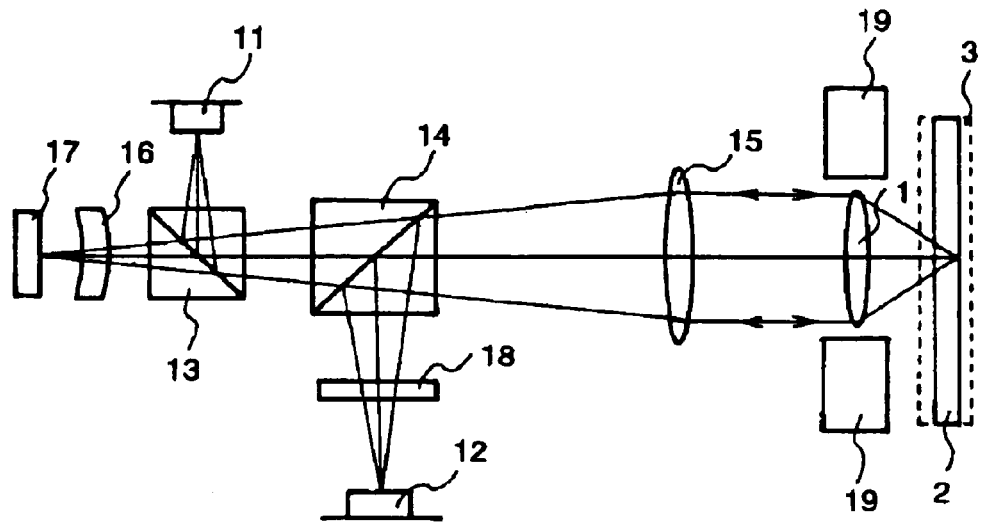
FIG. 8 shows an embodiment of an optical head according to the present invention.

FIG. 8 shows a preferred embodiment of an optical head using the objective lens according to the present invention. In FIG. 8, reference symbol 11 denotes a DVD laser, 12 a CD laser, 13 and 14 half prism, 15 a collimator lens, 16 a detection lens, 17 a light detector, 18 a diffraction grating, and 19 an actuator. The same elements as in FIG. 1 are denoted by the same reference symbols.

In FIG. 8, in a case of recording or reproducing the DVD disc 2, the DVD laser 11 is driven. A laser beam of the 655 nm wavelength generated in the DVD laser 11 is reflected by the half-prism 13, passes through the half-prism 14, and enters the collimator lens 15. Becoming parallel light at the collimator lens 15, the laser beam enters the objective lens 1 where it is condensed to form an optical spot on an information surface of the DVD disc 2. Then, the reflected light reflected by the DVD disc 2 becomes parallel light at the objective lens 1 to enter the collimator lens 15. At the collimator lens 15, the parallel light then becomes condensed light, which passes through the half-prisms 14 and 13 and the detection lens 16 to reach the light detector 17. Detection output signals in the light detector 17 are delivered to a signal processing circuit (not shown) where information recording and reproducing signals, focus error signals, and tracking error signals are obtained. A system control circuit (not shown) then controls an actuator drive circuit (not shown) to drive the actuator 19 so that the objective lens 1 is positioned in an appropriate focus position and tracking position based on the obtained focus error signals and tracking error signals.

On the other hand, in a case of recording or reproducing the CD disc 3, the CD laser 12 is driven. A laser beam of the 790 nm wavelength generated in the CD laser 11 passes through the diffraction grating 18, is reflected by the half-prism 14, and enters the collimator lens 15. Becoming parallel light at the collimator lens 15, the laser beam enters the objective lens 1 where it is condensed to form an optical spot on an information surface of the CD disc 3. Then, the reflected light reflected by the CD disc 3 becomes parallel light at the objective lens 1 to enter the collimator lens 15. At the collimator lens 15, the parallel light then becomes condensed light, which passes through the half-prisms 14 and 13 and the detection lens 16 to reach the light detector 17. Detection output signals in the light detector 17 are delivered to a signal processing circuit (not shown) where information recording and reproducing signals, focus error signals, and tracking error signals are obtained.

The tracking error signals in the case of CD disc 3 are obtained by ±first order light, which is one of three beams, zero-order light and ±first order light, diverged from the laser beam from the CD laser 12 with the diffraction grating 18.

Based on the tracking error signals obtained as above and the focus error signals, as is the case with the DVD disc 2, the actuator 19 is driven to arrange objective lens 1 in an appropriate focus position and tracking position.

It is also possible to make an optical structure in the optical systems common to both discs, such as the collimator lens 15 or the half-prism 14, instead of in the objective lens, so that they have the same functions as the objective lens according to the present invention. Also, while not shown, another optical element having the same functions as the objective lens of the present invention may be arranged on the optical path from the half-prism 14 through the disc 2 or 3.

The collimator lens 15 is not necessary, and the present invention is also applicable to an optical system of a so-called finite system.

Figure 9:
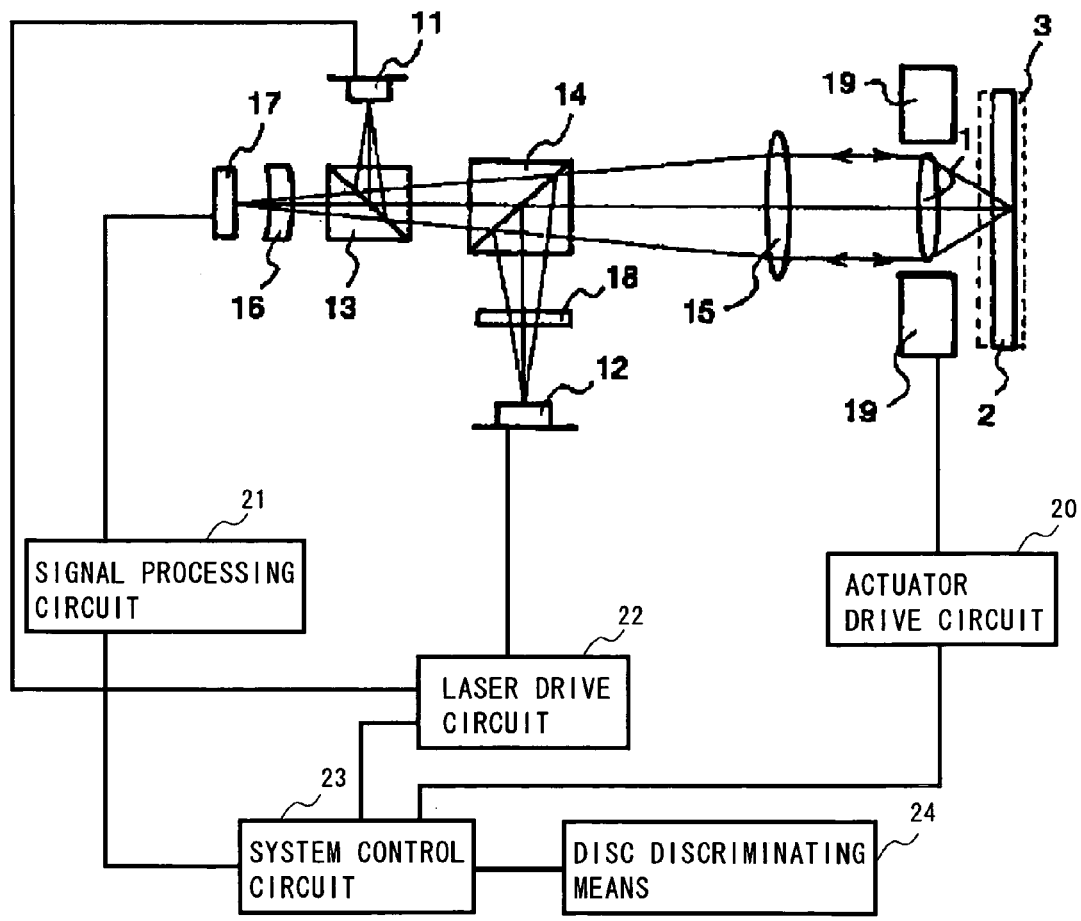
FIG. 9 shows an embodiment of an optical disc apparatus according to the present invention.

FIG. 9 shows a preferred embodiment of an optical disc apparatus using the objective lens according to the present invention. In FIG. 9, reference symbol 20 denotes an actuator drive circuit, 21 a signal processing circuit, 22 a laser drive circuit, 23 a system control circuit, and 24 disc discriminating means. The same elements as in FIG. 8 are denoted by the same reference symbols.

In FIG. 9, the structure of the optical pickup apparatus is the same as shown in FIG. 8.

First, the disc distinguishing means 24 distinguishes a type of a disc loaded. Among methods for distinguishing the disc are a method detecting the thickness of the disc substrate optically or mechanically and a method detecting a reference mark preciously stored in the disc or a disc cartridge. Or, there is also a method reproducing disc signals with tentative disc thickness and type, and judging that it is a disc of another thickness and type if normal signals are not obtained. The disc distinguishing means 24 then transmits the result to the system control circuit 23.

When the result shows that the disc is the DVD disc 2, the system control circuit 23 transmits a signal for lighting the DVD laser 11 to the laser drive circuit 22, and the DVD laser 11 light by the laser drive circuit 22. Thus, in an optical head, the laser beam having the 655 nm wavelength reaches the light detector 17, as is the embodiment shown in FIG. 8. The light detector 17 then transmits detection signals to the signal processing circuit 21 where information recording and reproducing signals, focus error signals, and tracking error signals are generated and transmitted to the system control circuit 23. The system control circuit 23 controls the actuator drive circuit 20 based on the focus error signals and tracking error signals to drive the actuator 19, thereby moving the objective lens 1 in the focus direction and tracking direction, which is called a servo circuit operation. By this operation, the focus control and tracking control are regularly processed, and the above circuits and the actuator 19 operate to arrange the object lens 1 in a right position to the DVD disc 2, thus suitably obtaining the information recording and reproducing signals.

On the other hand, when the result shows that the disc loaded is the CD disc 3, the system control circuit 23 transmits a signal for lighting the CD laser 12 to the laser drive circuit 22. The CD laser 12 thus generates the laser beam having the 790 nm wavelength. The subsequent operations are the same as the case of the optical head shown in FIG. 8. The laser beam reaches the light detector 17, and the circuits and the actuator 19 process the servo operation to obtain the information recording and reproducing signals suitably, as is the case with the DVD disc 2.

The inventor of the present invention has further found the followings facts regarding the second embodiment. A preferred lens surface structure for obtaining the wavefront aberration described above is as follows. In a multi-wavelength lens for condensing a plurality of kinds of monochromatic light with wavelength $\lambda i$ ($i=1, 2, 3, 4$ and so on) by refraction, a common use area for all the monochromatic light, which is formed on at least one surface of the lens, is sectioned into a plurality of aspherical zones, each having a different refractive power. If the height of a step portion between adjacent aspherical zones in the direction parallel to the lens axis is $Dj$ ($j=1,2,3,4$, and so on, in order of closeness to the lens axis), and the numerical aperture NA of a j-th step portion when light with wavelength $\lambda i$ enters is $NAij$, at least half of the steps satisfy the following formula when the minimum value of $Aij$ for each wavelength $\lambda i$ is $MIN(Aij)$, and the maximum value is $MAX(Aij)$:

$$\text{MAX}(Aij)/\text{MIN}(Aij) < 3 \qquad \text{Formula 1:}$$

where $Aij = \text{absolute}(Bij - mij)$,
  $Bij = (\text{absolute}(Dj))*(ni-1)/\lambda i - (NAij^2)*K/\lambda i$
  $ni$ is a refractive index of a lens for wavelength $\lambda i$
  $mij$ is an integral number closest to $Bij$
  $K = 0.0004$ mm when $NAij < 0.55$
  $K = 0.0005$ mm when $NAij \geq 0.55$ It is also preferred that $Aij$ in Formula 1 does not exceed 0.15. More preferably, $\text{MAX}(Aij)/\text{MIN}(Aij) < 2.5$, and most preferably, $\text{MAX}(Aij)/\text{MIN}(Aij) < 2$, which is Formula 2.

In Formula 1, $(\text{absolute}(Dj))*(ni-1)$ indicates displacement of an optical path length due to the step height $Dj$. $K*(NAij^2)$ is a corrective term of an optical path length, and it is required to correct the optical path length in the step portion for $0.0004 \times NA^2$ (mm) in the zone where NA is less than 0.55, and $0.0005 \times NA^2$ (mm) in the zone where NA is not less than 0.55. $Aij$ indicates how different the value $Bij$ is from the closest integral number. The smaller the value of each $Aij$ is, the lower the wavefront aberration is. Thus, it is preferred to reduce the value of $Aij$ appropriately for each wavelength $\lambda i$.

Table 5 below shows specific values obtained in the second embodiment.

TABLE 5

SECOND EMBODIMENT

| DVD | | | RADIUS (mm) | ADJACENT STEP Dj (mm) | REFRACTIVE INDEX n1 | WAVELENGTH $\lambda$ 1(mm) | Naij (DVD) |
|---|---|---|---|---|---|---|---|
| DVD | DVD/CD | D1 | 0.464667 | 0.001197502 | 1.604194 | 0.000655 | 0.138289 |
| FOCAL LENGTH = | COMMON | D2 | 0.687967 | 0.001209828 | 1.604194 | 0.000655 | 0.204745 |
| 3.360109 | USE AREA | D3 | 0.904685 | 0.001227195 | 1.604194 | 0.000655 | 0.269243 |

TABLE 5-continued

SECOND EMBODIMENT

|  |  |  | | | | | |
|---|---|---|---|---|---|---|---|
|  |  | D4 | 1.414529 | −0.001292291 | 1.604194 | 0.000655 | 0.420977 |
|  |  | D5 | 1.519145 | −0.001308012 | 1.604194 | 0.000655 | 0.452112 |
|  | DVD SOLE | D6 | 1.589366 | −0.000057205 | 1.604194 | 0.000655 | 0.47301 |
|  | USE AREA | D7 | 1.847991 | −0.002518796 | 1.604194 | 0.000655 |  |

| DVD | | | ABSOLUTE $(D_{ij}*(n1-1)/\lambda 1)$ | K | $K \times NA_{ij}^2/\lambda 1$ | $B_{ij}$ | $m_{ij}$ | $A_{ij}$ = ABSOLUTE $(B_{ij}-m_{ij})$ |
|---|---|---|---|---|---|---|---|---|
| DVD FOCAL LENGTH = 3.360109 | DVD/CD COMMON USE AREA | D1 | 1.104616182 | 0.0004 | 0.01167873 | 1.09293745 | 1 | 0.092937454 |
|  |  | D2 | 1.115986178 | 0.0004 | 0.02560042 | 1.09038576 | 1 | 0.090385758 |
|  |  | D3 | 1.132005499 | 0.0004 | 0.04426971 | 1.08773579 | 1 | 0.087735791 |
|  |  | D4 | 1.192053012 | 0.0004 | 0.10822699 | 1.08382602 | 1 | 0.083826020 |
|  |  | D5 | 1.206553933 | 0.0004 | 0.12482752 | 1.08172642 | 1 | 0.081726415 |
|  | DVD SOLE USE AREA | D6 |  |  |  |  |  |  |
|  |  | D7 |  |  |  |  |  |  |

| CD | | | RADIUS (mm) | ADJACENT STEP $D_j$ (mm) | REFRACTIVE INDEX n2 | WAVELENGTH $\lambda 2$(mm) | $NA_{ij}$ (CD) |
|---|---|---|---|---|---|---|---|
| CD FOCAL LENGTH = 3.382782 | DVD/CD COMMON USE AREA | D1 | 0.464667 | 0.001197502 | 1.599906 | 0.00079 | 0.137362 |
|  |  | D2 | 0.687967 | 0.001209828 | 1.599906 | 0.00079 | 0.203373 |
|  |  | D3 | 0.904685 | 0.001227195 | 1.599906 | 0.00079 | 0.267438 |
|  |  | D4 | 1.414529 | −0.001292291 | 1.599906 | 0.00079 | 0.418156 |
|  |  | D5 | 1.519145 | −0.001308012 | 1.599906 | 0.00079 | 0.449082 |
|  | DVD SOLE USE AREA | D6 | 1.589366 | −0.000057205 | 1.599906 | 0.00079 | 0.46984 |
|  |  | D7 | 1.847991 | −0.002518796 | 1.599906 | 0.00079 |  |

| CD | | | ABSOLUTE $(D_{ij}*(n2-1)/\lambda 2)$ | K | $K \times NA_{ij}^2/\lambda 2$ | $B_{ij}$ | $m_{ij}$ | $A_{ij}$ = ABSOLUTE $(B_{ij}-m_{ij})$ |
|---|---|---|---|---|---|---|---|---|
| CD FOCAL LENGTH = 3.382782 | DVD/CD COMMON USE AREA | D1 | 0.909352798 | 0.0004 | 0.00955363 | 0.899799163 | 1 | 0.100200837 |
|  |  | D2 | 0.918712916 | 0.0004 | 0.02094210 | 0.897770817 | 1 | 0.102229183 |
|  |  | D3 | 0.931900485 | 0.0004 | 0.03621427 | 0.895686223 | 1 | 0.104313777 |
|  |  | D4 | 0.981333389 | 0.0004 | 0.08853372 | 0.892799673 | 1 | 0.107200327 |
|  |  | D5 | 0.993270977 | 0.0004 | 0.10211357 | 0.891157412 | 1 | 0.108842588 |
|  | DVD SOLE USE AREA | D6 |  |  |  |  |  |  |
|  |  | D7 |  |  |  |  |  |  |

|  |  | MAX($A_{ij}$) | MIN($A_{ij}$) | MAX($A_{ij}$)/ MIN($A_{ij}$) |
|---|---|---|---|---|
| DVD/CD COMMON USE AREA | D1 | 0.100200837 | 0.092937454 | 1.078153449 |
|  | D2 | 0.102229183 | 0.090385758 | 1.131031977 |
|  | D3 | 0.104313777 | 0.087735791 | 1.188953514 |
|  | D4 | 0.107200327 | 0.083826020 | 1.278843101 |
|  | D5 | 0.108842588 | 0.081726415 | 1.331792025 |

$B_{ij} = (ABSOLUTE(D_{ij}*(n_i-1)/\lambda i)) - ((K/\lambda i)*(NA_{ij}^2))$

Figure 14:
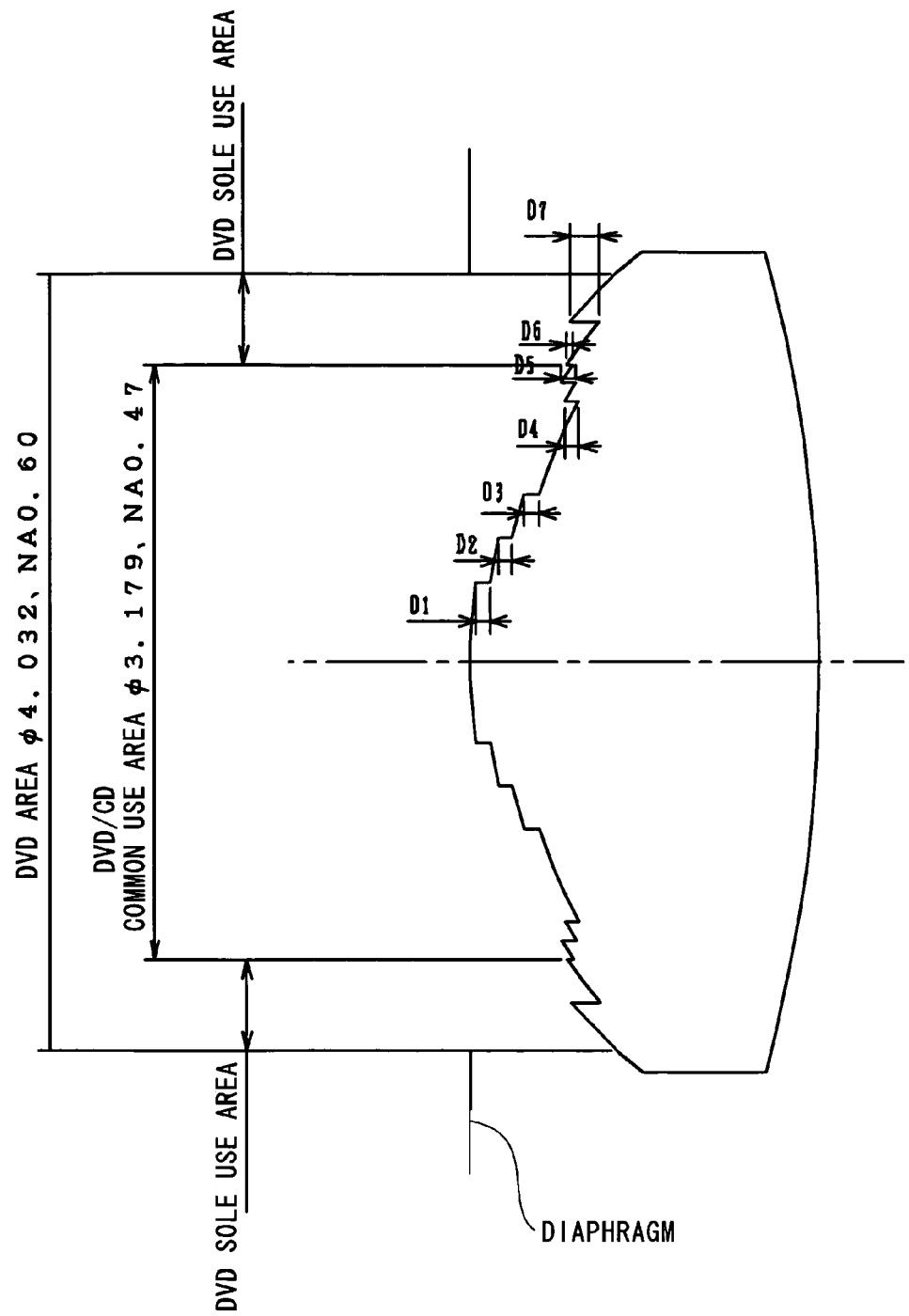
FIG. 14 shows a lens surface structure where the heights of step portions between adjacent aspherical zones are D1 to D7 in the second embodiment of the present invention.

FIG. 14 shows a lens surface structure where the heights of the step portions between adjacent aspherical zones are D1 to D7 in the second embodiment. In the second embodiment, the zones 1 to 6 in Table 2 are a DVD/CD common use area, and the zones 7 to 8 are a DVD sole use area. Formulas 1 and 2 calculate about the step heights within the DVD/CD common use area, which are from D1 to D5. The step heights D1 to D7, in FIG. 14, have positive signs if an aspherical surface closer to the lens optical axis is to the left of the adjacent aspherical surface in a step portion, and they have negative signs if the surface is to the right. Thus, in the second embodiment shown in FIG. 14 and Table 5, the step heights D1, D2, and D3 have plus signs and D4, D5, D6, and D7 have minus signs. The shape of the steps on the lens surface according to the second embodiment is shown in FIG. 14, and such a shape may be formed by injection molding if the lens is made of plastic, or by glass molding if the lens is made of glass. In each case, a mold is produced to form a lens out of the mold. A lens surface designed in consideration with production of a mold and molding are shown in FIGS. 15 and 16.

Figure 15:
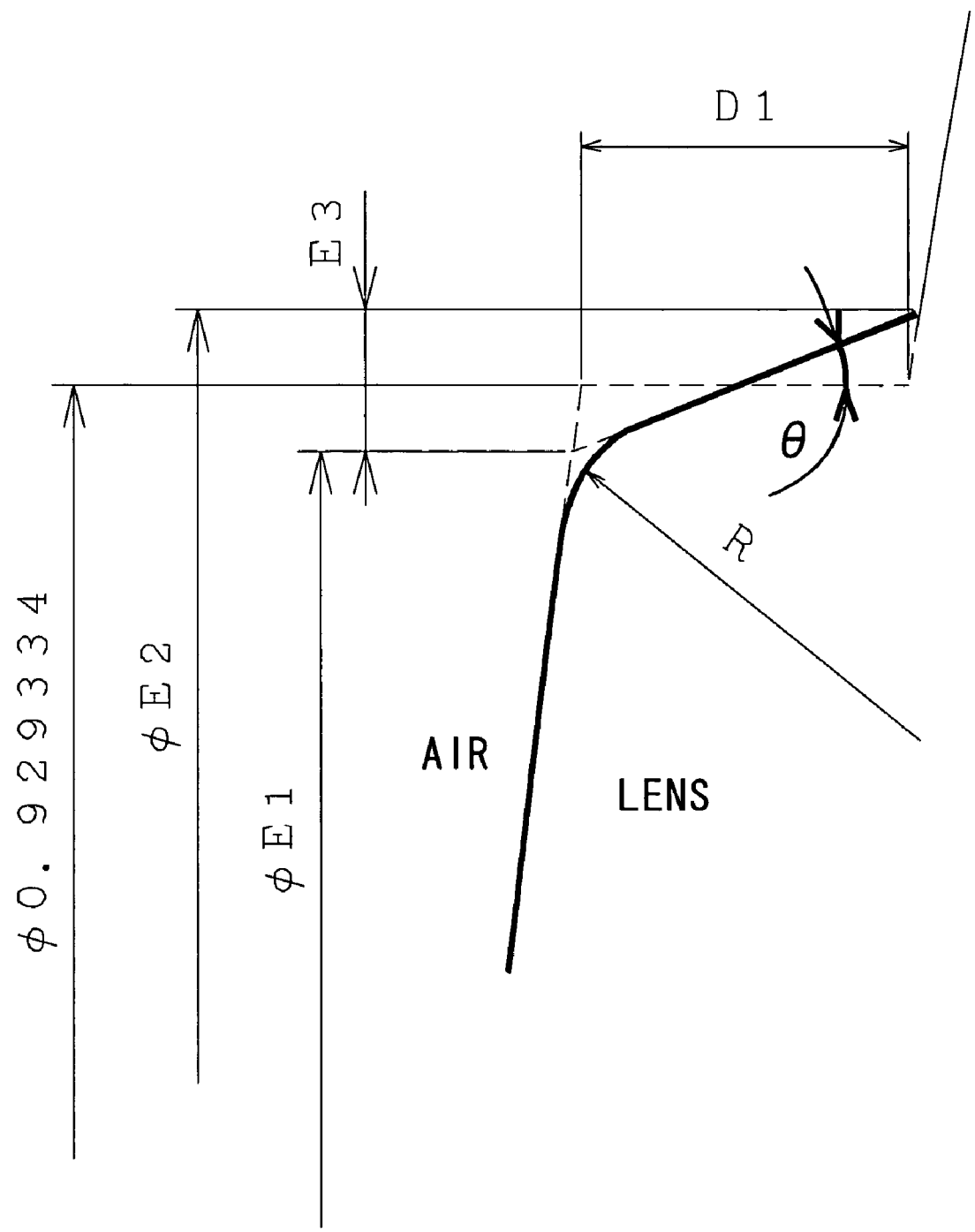
FIG. 15 shows a lens having a shape designed in consideration with mold formation and molding.

FIG. 15 is an enlarged view of a step portion having a step height D1 shown in FIG. 14. In FIG. 15, the step portion is tapered (drafted) at θ degree and the left corner is rounded as shown in solid line. The rounding of the corner is made to allow a cutting tool to accurately form a mold, and the draft angle θ is made to facilitate the injection molding or glass molding. The way to define the step height D1, which is a difference in height between the aspherical surfaces of Zones 1 and 2 is shown in dotted line. The aspherical surfaces of Zones 1 and 2 are each extended to a given radius, and the distance in the predetermined radius from the aspherical surface of Zone 1 to the aspherical surface of Zone 2 in the direction parallel to the lens optical axis is the step height D1. In case the given radius is not certain, a given part of the diameter φE1 to φE2 may serve as a given radius.

Though the part having the dimension E3 in FIG. 15 is an inactive area which does not contribute to optical image formation, this area is as small as 0.0005 to 0.001 mm, which is very minute compared to the DVD active area of φ4.032 mm and the CD active area of φ3.179mm, thus causing no significant problem. In order to further reduce the inactive area, the draft angle may be decreased or the corner radius R may be decreased or set to zero. On the contrary, the draft angle may be increased or the corner radius R may be increased, though it increases the inactive area.

Figure 16:
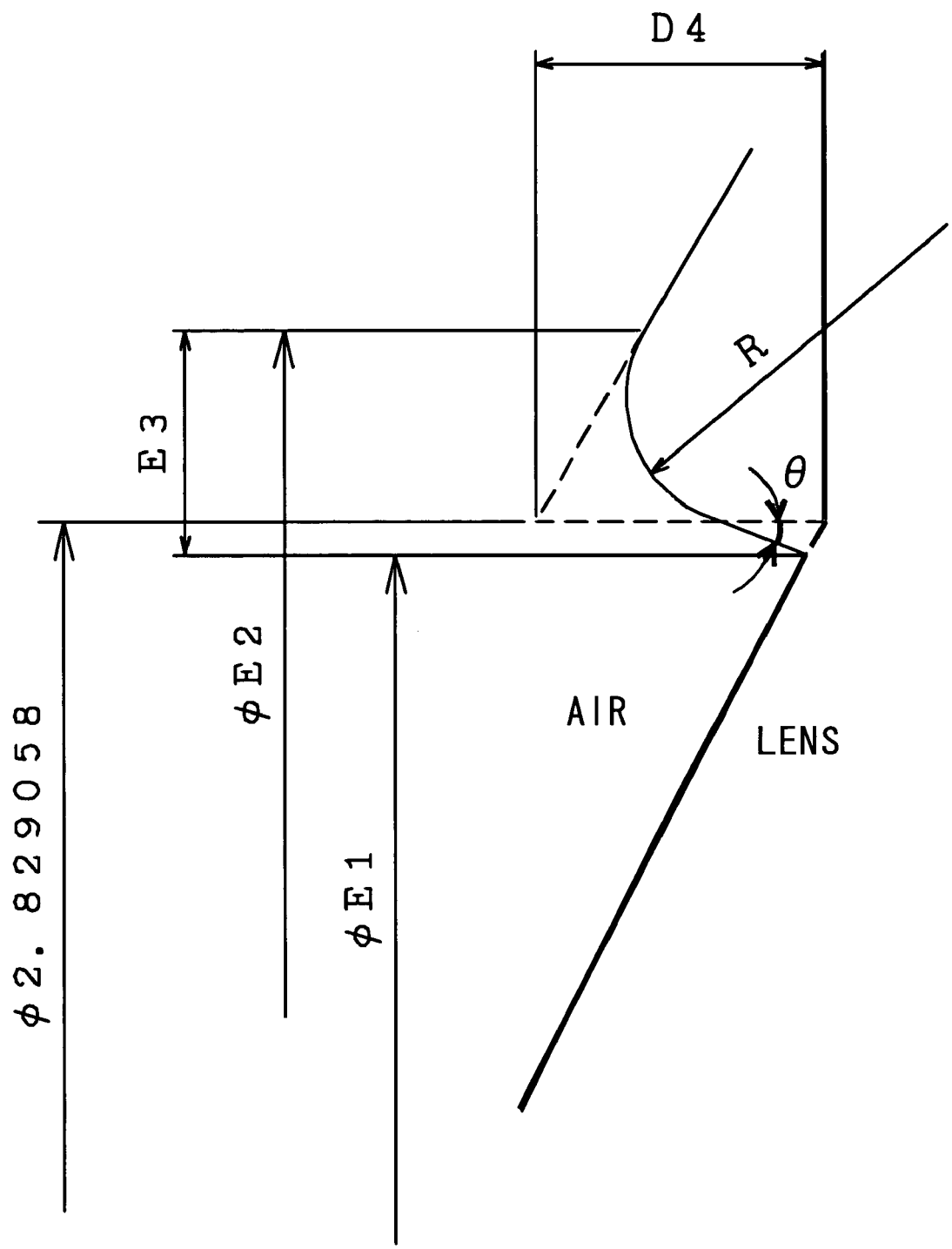
FIG. 16 shows a lens having a shape designed in consideration with mold formation and molding.

FIG. 16 is an enlarged view of a step portion having a step height D4 shown in FIG. 14. In FIG. 16, the step portion is tapered (drafted) at θ degree and the left corner is rounded as shown in solid line. The definition of the step height D4, draft and rounding are the same as explained in FIG. 15.

Though, as explained above, the second embodiment allows producing low wavefront aberration as shown in FIG. 11, there may be a case where the wavefront aberration should be particularly reduced in a certain part. For example, to reduce the wavefront aberration for CD in Zone 1 further than that shown in FIG. 11, the third embodiment shown in Table 6 below may be used.

TABLE 6

THIRD EMBODIMENT

| ZONE j | h | B | C | K | A4 | A6 |
|---|---|---|---|---|---|---|
| 1 | 0~0.464667 | 0 | 4.45390E−01 | −6.67483 | 0.0275 | 1.026695 |
| 2 | 0.464667~0.687967 | 0.00108409 | 4.46999E−01 | −8.52884E−01 | −1.11390E−03 | 8.21580E−03 |
| 3 | 0.687967~0.904685 | 0.00216818 | 4.45826E−01 | −5.85171E−01 | 2.36910E−03 | −5.00360E−03 |
| 4 | 0.904685~1.414529 | 0.00325226 | 4.46759E−01 | −6.51167E−01 | 9.59140E−04 | 4.83750E−04 |
| 5 | 1.414529~1.519145 | 0.00216818 | 4.28660E−01 | −3.27869E−01 | 6.74850E−03 | 3.92010E−04 |
| 6 | 1.519145~1.589366 | 0.00108409 | 4.42061E−01 | −5.75461E−01 | 2.50970E−03 | 1.75070E−04 |
| 7 | 1.589366~1.847991 | 0.00103073 | 4.45481E−01 | −6.24870E−01 | 1.77360E−03 | 1.24130E−04 |
| 8 | 1.847991~2.2 | −0.00113744 | 4.45319E−01 | −6.13552E−01 | 1.64620E−03 | 1.15930E−04 |

| ZONE j | A8 | A10 | A12 | A14 | A16 |
|---|---|---|---|---|---|
| 1 | −14.364412 | 106.233381 | −431.806672 | 895.812958 | −725.25403 |
| 2 | 9.75070E−03 | −3.03780E−02 | −4.03770E−02 | 1.80080E−01 | −1.49931E−01 |
| 3 | 4.59410E−03 | 3.04280E−03 | −8.16540E−03 | 6.55040E−03 | −2.40830E−03 |
| 4 | 2.53240E−04 | −1.24670E−04 | −1.01670E−04 | 7.59740E−05 | −1.37590E−05 |
| 5 | −1.18360E−04 | −4.24370E−04 | 7.93880E−05 | 1.45720E−04 | −3.75090E−05 |
| 6 | −2.24990E−04 | −1.73810E−05 | 6.71230E−07 | 1.64740E−05 | −3.96660E−06 |
| 7 | −7.34610E−05 | 2.76610E−05 | −9.44330E−06 | 1.32750E−06 | −6.17570E−08 |
| 8 | −7.50480E−05 | 2.80220E−05 | −9.53270E−06 | 1.33720E−06 | −6.23130E−08 |

Figure 17A:
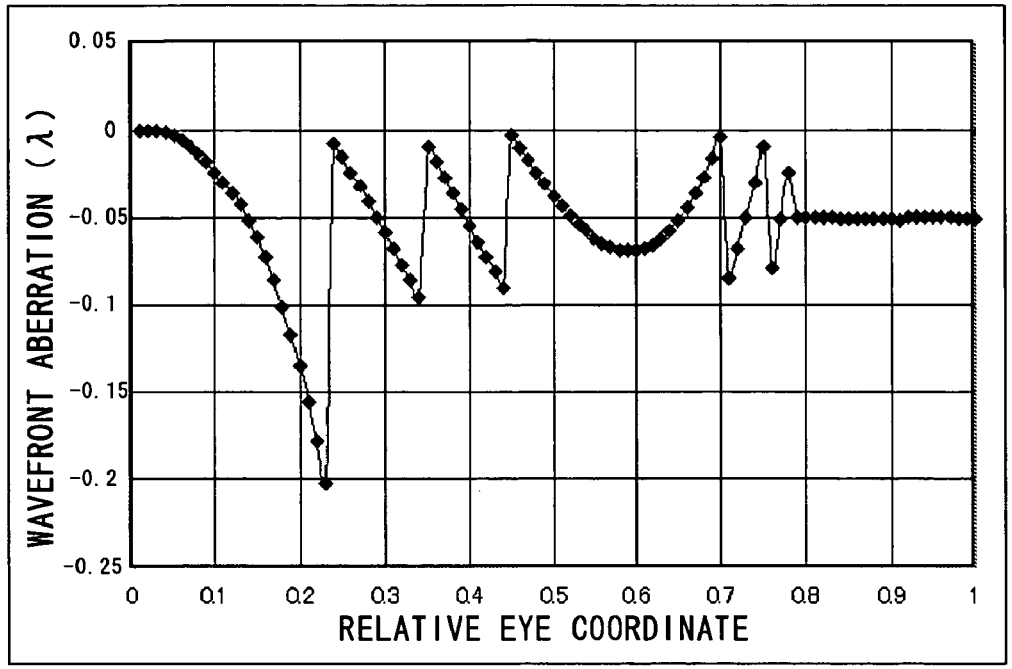
FIGS. 17A and 17B show a wavefront aberration graph of a lens according to the third embodiment of the present invention.
Figure 17B:
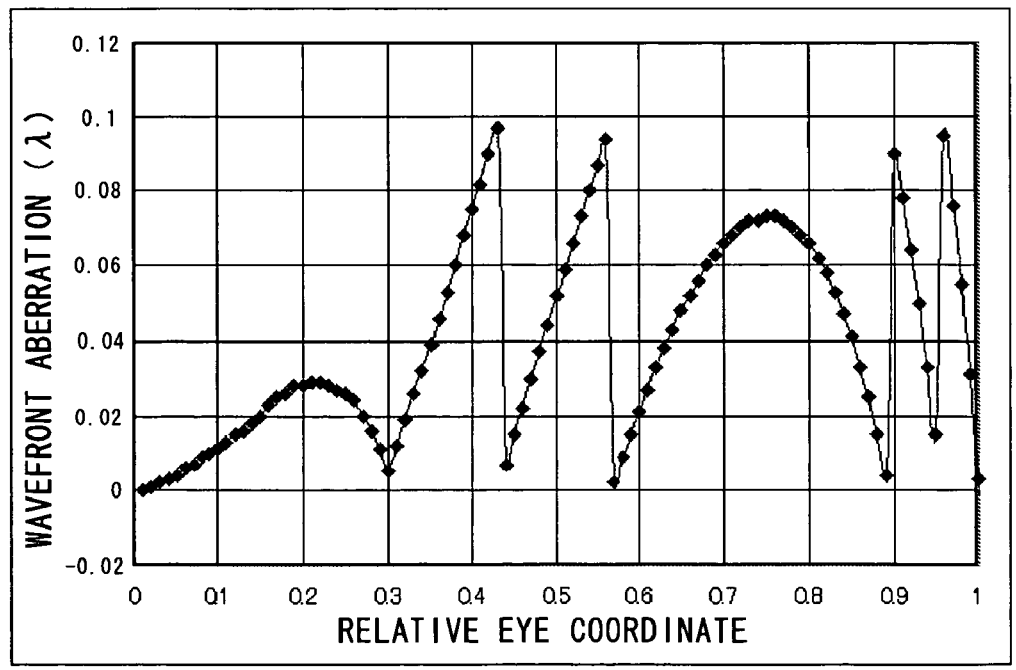

The third embodiment changes the value of A4 in Zone 1 of the second embodiment shown in Table 2. FIGS. 17A and 17B show the wavefront aberration graph of the third embodiment and Table 7 shows the calculation results regarding Formulas 1 and 2.

TABLE 7

THIRD EMBODIMENT

| DVD | | | RADIUS (mm) | ADJACENT STEP Dj (mm) | REFRACTIVE INDEX n1 | WAVELENGTH λ1(mm) | Naij (DVD) |
|---|---|---|---|---|---|---|---|
| DVD | DVD/CD | D1 | 0.464667 | 0.001314843 | 1.604194 | 0.000655 | 0.138289251 |
| FOCAL LENGTH = | COMMON | D2 | 0.687967 | 0.001209828 | 1.604194 | 0.000655 | 0.204745422 |
| 3.360109321 | USE AREA | D3 | 0.904685 | 0.001227195 | 1.604194 | 0.000655 | 0.269242728 |
| | | D4 | 1.414529 | −0.00129229 | 1.604194 | 0.000655 | 0.420977077 |
| | | D5 | 1.519145 | −0.00130801 | 1.604194 | 0.000655 | 0.452111778 |
| | DVD SOLE | D6 | 1.589366 | −0.000057205 | 1.604194 | 0.000655 | 0.473010205 |
| | USE AREA | D7 | 1.847991 | −0.0025188 | 1.604194 | 0.000655 | |

| DVD | | | ABSOLUTE (Dij*(n1−1)/λ1) | K | K × NAij^2/λ1 | Bij | mij | Aij = ABSOLUTE (Bij − mij) |
|---|---|---|---|---|---|---|---|---|
| DVD | DVD/CD | D1 | 1.21285565 | 0.0004 | 0.01167873 | 1.20117692 | 1 | 0.201176922 |
| FOCAL LENGTH = | COMMON | D2 | 1.115986178 | 0.0004 | 0.02560042 | 1.09038576 | 1 | 0.090385758 |
| 3.360109321 | USE AREA | D3 | 1.132005499 | 0.0004 | 0.04426971 | 1.08773579 | 1 | 0.087735791 |
| | | D4 | 1.192053012 | 0.0004 | 0.10822699 | 1.08382602 | 1 | 0.083826020 |

TABLE 7-continued

THIRD EMBODIMENT

| | | | | | | | | |
|---|---|---|---|---|---|---|---|---|
| | DVD SOLE USE AREA | D5 D6 D7 | 1.206553933 | 0.0004 | 0.12482752 | 1.08172642 | 1 | 0.081726415 |

| CD | | | RADIUS (mm) | ADJACENT STEP Dj (mm) | REFRACTIVE INDEX n2 | WAVELENGTH $\lambda 2$(mm) | Naij (CD) |
|---|---|---|---|---|---|---|---|
| CD FOCAL LENGTH = 3.382781591 | DVD/CD COMMON USE AREA | D1 D2 D3 D4 D5 | 0.464667 0.687967 0.904685 1.414529 1.519145 | 0.001314843 0.001209828 0.001227195 −0.00129229 −0.00130801 | 1.599906 1.599906 1.599906 1.599906 1.599906 | 0.00079 0.00079 0.00079 0.00079 0.00079 | 0.137362401 0.203373165 0.267438194 0.418155581 0.449081609 |
| | DVD SOLE USE AREA | D6 D7 | 1.589366 1.847991 | −0.000057205 −0.0025188 | 1.599906 1.599906 | 0.00079 0.00079 | 0.46983997 |

| CD | | | ABSOLUTE (Dij*(n2 − 1)/$\lambda 2$) | K | K × NAij$^2$/$\lambda 2$ | Bij | mij | Aij = ABSOLUTE (Bij − mij) |
|---|---|---|---|---|---|---|---|---|
| CD FOCAL LENGTH = 3.382781591 | DVD/CD COMMON USE AREA | D1 D2 D3 D4 D5 | 0.998458737 0.918712916 0.931900495 0.981333389 0.993270977 | 0.0004 0.0004 0.0004 0.0004 0.0004 | 0.00955363 0.02094210 0.03621427 0.08853372 0.10211357 | 0.988905102 0.897770817 0.895686223 0.892799673 0.891157412 | 1 1 1 1 1 | 0.011094898 0.102229183 0.104313777 0.107200327 0.108842588 |
| | DVD SOLE USE AREA | D6 D7 | | | | | | |

| | | MAX(Aij) | MIN(Aij) | MAX(Aij)/ MIN(Aij) |
|---|---|---|---|---|
| DVD/CD COMMON USE AREA | D1 D2 D3 D4 D5 | 0.201176922 0.102229183 0.104313777 0.107200327 0.108842588 | 0.011094898 0.090385758 0.087735791 0.083826020 0.081726415 | 18.1324 1.1310 1.1890 1.2788 1.3318 |

FIG. 17B shows that the wavefront aberration for CD is reduced in Zone 1. While the wavefront aberration for CD in Zone 1 is 0 to 0.095 λ in the second embodiment shown in FIG. 11, it is reduced to 0 to 0.03 λ in the third embodiment shown in FIG. 17B. On the other hand, though the wavefront aberration for DVD in Zone 1 is 0 to −0.1 λ in the second embodiment, it is increased to 0 to −0.2 λ in the third embodiment as shown in FIG. 17A. The RMS wavefront aberration is as follows:

| | DVD | CD |
|---|---|---|
| Embodiment 2: | 0.01945 λRMS | 0.02525 λRMS |
| Embodiment 3: | 0.02495 λRMS | 0.02574 λRMS |

Thus, though the RMS wavefront aberration for DVD becomes higher in the third embodiment, it still does not exceed 0.025 λRMS. As for Formulas 1 and 2, as shown in Table 7, the value of MAX(Aij)/MIN(Aij) is 18.1324, which is more than 3 and of course more than 2, in the portion corresponding to D1. The value is not more than 2 in the portions corresponding to D2, D3, D4, and D5; thus, MAX (Aij)/MIN(Aij)<2 is satisfied in four portions out of five, but not satisfied in one portions. This shows that the RMS wavefront aberration can be 0.025 λRMS or less for both DVD and CD if the above formula is satisfied in four portions out of five, but the wavefront aberration for DVD is higher compared to the case where the formula is satisfied in all the five portions. Though the third embodiment explains a case of reducing the wavefront aberration for CD in Zone 1, it is also possible to reduce the wavefront aberration for DVD in Zone 1, which results in increase in the RMS wavefront aberration for CD.

Further, to reduce the wavefront aberration for CD in Zone 2 in addition to in Zone 1, the fourth embodiment shown in Table 8 below may be used.

TABLE 8

FOURTH EMBODIMENT

| ZONE j | h | B | C | K | A4 | A6 |
|---|---|---|---|---|---|---|
| 1 | 0~0.464667 | 0 | 4.45390E−01 | −6.67483 | 0.0275 | 1.026695 |
| 2 | 0.464667~0.687967 | 0.00108409 | 4.46999E−01 | −8.52884E−01 | −1.11390E−03 | 8.21580E−03 |
| 3 | 0.687967~0.904685 | 0.00216818 | 4.45826E−01 | −5.85171E−01 | 2.36910E−03 | −5.00360E−03 |
| 4 | 0.904685~1.414529 | 0.00325226 | 4.46759E−01 | −6.51167E−01 | 9.59140E−04 | 4.83750E−04 |
| 5 | 1.414529~1.519145 | 0.00216818 | 4.28660E−01 | −3.27869E−01 | 6.74850E−03 | 3.92010E−04 |
| 6 | 1.519145~1.589366 | 0.00108409 | 4.42061E−01 | −5.74561E−01 | 2.50970E−03 | 1.75070E−04 |

TABLE 8-continued

FOURTH EMBODIMENT

| | | | | | | |
|---|---|---|---|---|---|---|
| 7 | 1.589366~1.847991 | 0.00103073 | 4.45481E-01 | -6.24870E-01 | 1.77360E-03 | 1.24130E-04 |
| 8 | 1.847991~2.2 | -0.00113744 | 4.45319E-01 | -6.13552E-01 | 1.64620E-03 | 1.15930E-04 |

| ZONE j | A8 | A10 | A12 | A14 | A16 |
|---|---|---|---|---|---|
| 1 | -14.364412 | 106.233381 | -431.806672 | 895.812958 | -725.25403 |
| 2 | 9.75070E-03 | -3.03780E-02 | -4.03770E-02 | 1.80080E-01 | -2.00000E-01 |
| 3 | 4.59410E-03 | 3.04280E-03 | -8.16540E-03 | 6.55040E-03 | -2.40830E-03 |
| 4 | 2.53240E-04 | -1.24670E-04 | -1.01670E-04 | 7.59740E-05 | -1.37590E-05 |
| 5 | -1.18360E-03 | -4.24370E-04 | 7.93880E-05 | 1.45720E-04 | -3.75090E-05 |
| 6 | -2.24990E-04 | -1.73810E-05 | 6.71230E-07 | 1.64740E-05 | -3.96660E-06 |
| 7 | -7.34610E-05 | 2.76610E-05 | -9.44330E-06 | 1.32750E-06 | -6.17570E-08 |
| 8 | -7.50480E-05 | 2.80220E-05 | -9.53270E-06 | 1.33720E-06 | -6.23130E-08 |

Figure 18A:
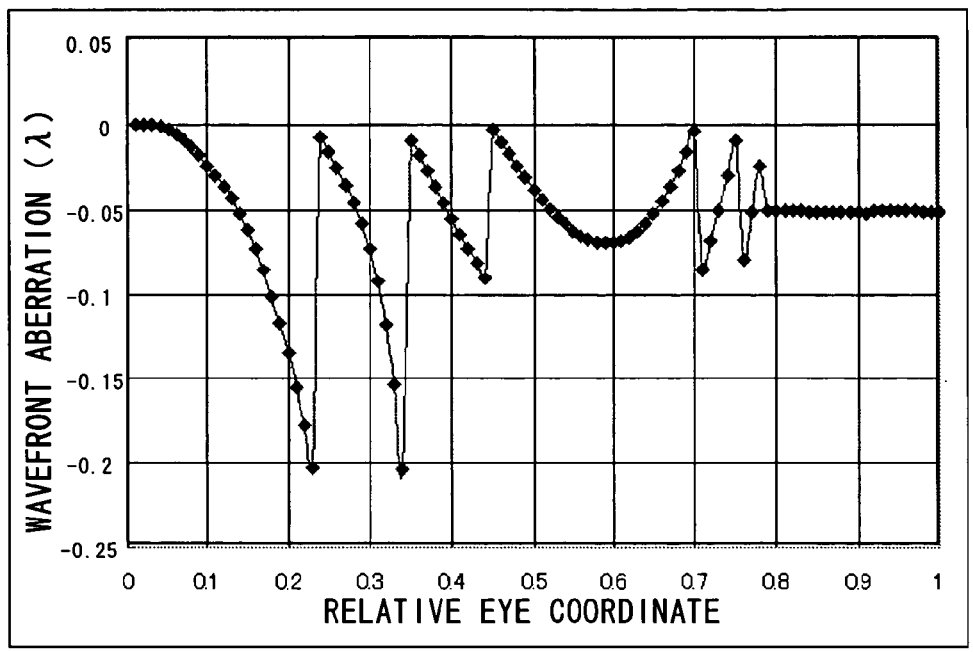
FIGS. 18A and 18B show a wavefront aberration graph of a lens according to the fourth embodiment of the present invention.
Figure 18B:
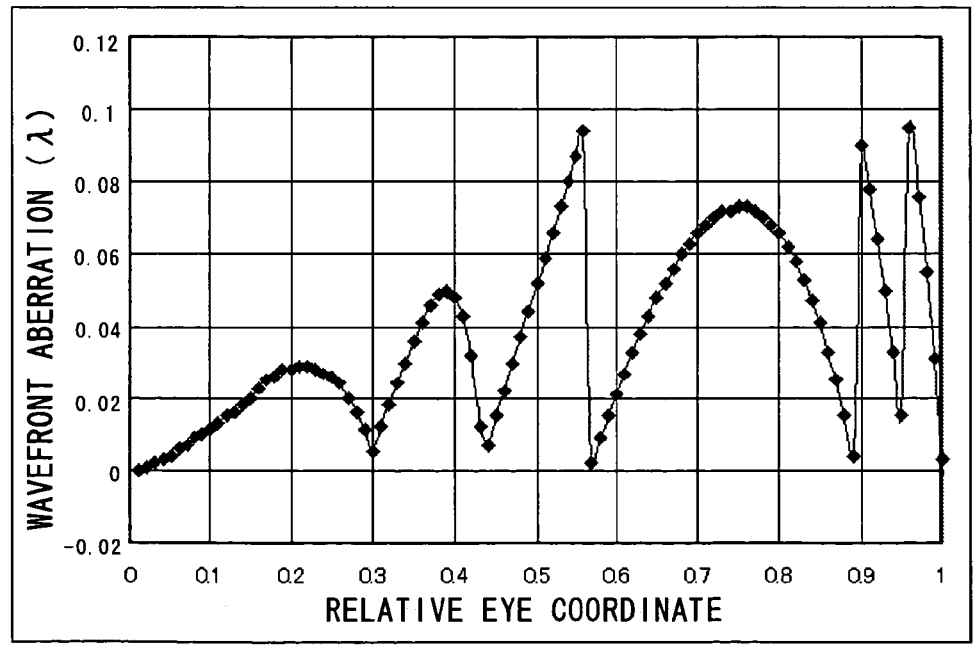

The fourth embodiment changes the value of A16 in Zone 2 of the third embodiment shown in Table 6. FIGS. 18A and 18B show the wavefront aberration graph of the fourth embodiment and Table 9 below shows the calculation results regarding Formulas 1 and 2.

TABLE 9

FOURTH EMBODIMENT
1 ZONE - A4 +0.0275
2 ZONES - A16 -0.2

| DVD | | | RADIUS (mm) | ADJACENT STEP Dj(mm) | REFRACTIVE INDEX n1 | WAVELENGTH λ 1(mm) | Naij (DVD) |
|---|---|---|---|---|---|---|---|
| DVD | DVD/CD | 01 | 0.464667 | 0.001314607 | 1.604194 | 0.000655 | 0.138289251 |
| FOCAL LENGTH = | COMMON USE | D2 | 0.687967 | 0.001335909 | 1.604194 | 0.000655 | 0.204745422 |
| 3.360109321 | AREA | D3 | 0.904685 | 0.001227195 | 1.604194 | 0.000655 | 0.269242728 |
| | | D4 | 1.414529 | -0.00129229 | 1.604194 | 0.000655 | 0.420977077 |
| | | D5 | 1.519145 | -0.00130801 | 1.604194 | 0.000655 | 0.452111778 |
| | DVD SOLE | D6 | 1.589366 | -0.000057205 | 1.604194 | 0.000655 | 0.473010205 |
| | USE AREA | D7 | 1.847991 | -0.0025188 | 1.604194 | 0.000655 | |

| DVD | | | ABSOLUTE (Dij*(n1 - 1)/λ 1) | K | K × NAij^2/λ 1 | Bij | mij | Aij = ABSOLUTE (Bij - mij) |
|---|---|---|---|---|---|---|---|---|
| DVD | DVD/CD | 01 | 1.212637491 | 0.0004 | 0.01167873 | 1.20095876 | 1 | 0.200958763 |
| FOCAL LENGTH = | COMMON USE | D2 | 1.23228779 | 0.0004 | 0.02560042 | 1.20668737 | 1 | 0.206687370 |
| 3.360109321 | AREA | D3 | 1.132005499 | 0.0004 | 0.04426971 | 1.08773579 | 1 | 0.087735791 |
| | | D4 | 1.192053012 | 0.0004 | 0.10822699 | 1.08382602 | 1 | 0.083826020 |
| | | D5 | 1.206553933 | 0.0004 | 0.12482752 | 1.08172642 | 1 | 0.081726415 |
| | DVD SOLE | D6 | | | | | | |
| | USE AREA | D7 | | | | | | |

| CD | | | RADIUS (mm) | ADJACENT STEP Dj(mm) | REFRACTIVE INDEX n2 | WAVELENGTH λ 2(mm) | Naij (CD) |
|---|---|---|---|---|---|---|---|
| CD | DVD/CD | D1 | 0.464667 | 0.001314607 | 1.599906 | 0.00079 | 0.137362401 |
| FOCAL LENGTH = | COMMON USE | D2 | 0.687967 | 0.001335909 | 1.599906 | 0.00079 | 0.203373165 |
| 3.382781591 | AREA | D3 | 0.904685 | 0.001227195 | 1.599906 | 0.00079 | 0.267438194 |
| | | D4 | 1.414529 | -0.00129229 | 1.599906 | 0.00079 | 0.418155581 |
| | | D5 | 1.519145 | -0.00130801 | 1.599906 | 0.00079 | 0.449081609 |
| | DVD SOLE | D6 | 1.589366 | -0.000057205 | 1.599906 | 0.00079 | 0.46983997 |
| | USE AREA | D7 | 1.847991 | -0.0025188 | 1.599906 | 0.00079 | |

| CD | | | ABSOLUTE (Dij*(n2 - 1)/λ 2) | K | K × NAij^2/λ 2 | Bij | mij | Aij = ABSOLUTE (Bij - mij) |
|---|---|---|---|---|---|---|---|---|
| CD | DVD/CD | D1 | 0.998279142 | 0.0004 | 0.00955363 | 0.988725507 | 1 | 0.011274493 |
| FOCAL LENGTH = | COMMON USE | D2 | 1.014455851 | 0.0004 | 0.02094210 | 0.993513753 | 1 | 0.006486247 |
| 3.382781591 | AREA | D3 | 0.931900495 | 0.0004 | 0.03621427 | 0.895686223 | 1 | 0.104313777 |
| | | D4 | 0.981333389 | 0.0004 | 0.08853372 | 0.892799673 | 1 | 0.107200327 |
| | | D5 | 0.993270977 | 0.0004 | 0.10211357 | 0.891157412 | 1 | 0.108842588 |
| | DVD SOLE | D6 | | | | | | |
| | USE AREA | D7 | | | | | | |

TABLE 9-continued

FOURTH EMBODIMENT
1 ZONE - A4 +0.0275
2 ZONES - A16 −0.2

| | | MAX(Aij) | MIN(Aij) | MAX(Aij)/ MIN(Aij) |
|---|---|---|---|---|
| DVD/CD | D1 | 0.200958763 | 0.011274493 | 17.8242 |
| COMMON USE | D2 | 0.206687370 | 0.006486247 | 31.8655 |
| AREA | D3 | 0.104313777 | 0.087735791 | 1.1890 |
| | D4 | 0.107200327 | 0.083826020 | 1.2788 |
| | D5 | 0.108842588 | 0.081726415 | 1.3318 |

DVD 0.029263 λ nms
CD 0.024889 λ nms

FIG. 18B shows that the wavefront aberration for CD is further reduced in Zone 2 as well compared to the third embodiment. While the wavefront aberration for CD in Zone 2 is 0 to 0.098 λ in the second and third embodiments shown in FIGS. 11 and 17B, it is reduced to 0 to 0.05 λ in the fourth embodiment shown in FIG. 18B. On the other hand, though the wavefront aberration for DVD in Zone 2 is 0 to −0.1 λ in the second and third embodiments shown in FIGS. 11 and 17A, it is increased to 0 to −0.2 λ in the fourth embodiment shown in FIG. 18A. The RMS wavefront aberration is as follows:

| | DVD | CD |
|---|---|---|
| Embodiment 2: | 0.01945 λRMS | 0.02525 λRMS |
| Embodiment 3: | 0.02495 λRMS | 0.02574 λRMS |
| Embodiment 4: | 0.02926 λRMS | 0.02489 λRMS |

Thus, though the RMS wavefront aberration for DVD becomes higher in the fourth embodiment than in the third embodiment, it still does not exceed 0.03 □RMS. As for Formulas 1 and 2, as shown in Table 9, the value of MAX(Aij)/MIN(Aij) in the portions corresponding to D1 and D2 are 17.8242 and 31.8655, which are more than 3 and of course more than 2 in the fourth embodiment. The value is not more than 2 in the portions corresponding to D3, D4, and D5; thus, MAX(Aij)/MIN(Aij)<2 is satisfied in three zones out of five, but not satisfied in two zones. This shows that the RMS wavefront aberration can be 0.030 λRMS or less for both DVD and CD if the above formula is satisfied in three portions out of five, but the wavefront aberration for DVD is higher compared to the case where the formula is satisfied in all the five portions or four portions out of five. Though the fourth embodiment explains a case of reducing the wavefront aberration for CD in Zones 1 and 2, it is also possible to reduce the wavefront aberration for DVD in Zones 1 and 2, which results in increase in RMS the wavefront aberration for CD.

Further, to reduce the wavefront aberration for CD in Zone 3 in addition to Zones 1 and 2, the comparative example shown in Table 10 below may be used.

TABLE 10

COMPARATIVE EXAMPLE

| ZONE j | h | B | C | K | A4 | A6 |
|---|---|---|---|---|---|---|
| 1 | 0~0.464667 | 0 | 4.45390E−01 | −6.67483 | 0.0275 | 1.026695 |
| 2 | 0.464667~0.687967 | 0.00108409 | 4.46999E−01 | −8.52884E−01 | −1.11390E−03 | 8.21580E−03 |
| 3 | 0.687967~0.904685 | 0.00216818 | 4.45826E−01 | −5.85171E−01 | 2.36910E−03 | −5.00360E−03 |
| 4 | 0.904685~1.414529 | 0.00325226 | 4.46759E−01 | −6.51167E−01 | 9.59140E−04 | 4.83750E−04 |
| 5 | 1.414529~1.519145 | 0.00216818 | 4.28660E−01 | −3.27869E−01 | 6.74850E−03 | 3.92010E−04 |
| 6 | 1.519145~1.589366 | 0.00108409 | 4.42061E−01 | −5.75461E−01 | 2.50970E−03 | 1.75070E−04 |
| 7 | 1.589366~1.847991 | 0.00103073 | 4.45481E−01 | −6.24870E−01 | 1.77360E−03 | 1.24130E−04 |
| 8 | 1.847991~2.2 | −0.00113744 | 4.45319E−01 | −6.13552E−01 | 1.64620E−03 | 1.15930E−04 |

| ZONE j | A8 | A10 | A12 | A14 | A16 |
|---|---|---|---|---|---|
| 1 | −14.364412 | 106.233381 | −431.806672 | 895.812958 | −725.25403 |
| 2 | 9.75070E−03 | −3.03780E−02 | −4.03770E−02 | 1.80080E−01 | −2.00000E−01 |
| 3 | 4.59410E−03 | 3.04280E−03 | −8.16540E−03 | 6.55040E−03 | −3.35000E−03 |
| 4 | 2.53240E−04 | −1.24670E−04 | −1.01670E−04 | 7.59740E−05 | −1.37590E−05 |
| 5 | −1.18360E−03 | −4.24370E−04 | 7.93880E−05 | 1.45720E−04 | −3.75090E−05 |
| 6 | −2.24990E−04 | −1.73810E−05 | 6.71230E−07 | 1.64740E−05 | −3.96660E−06 |
| 7 | −7.34610E−05 | 2.76610E−05 | −9.44330E−06 | 1.32750E−06 | −6.17570E−08 |
| 8 | −7.50480E−05 | 2.80220E−05 | −9.53270E−06 | 1.33720E−06 | −6.23130E−08 |

Figure 19A:
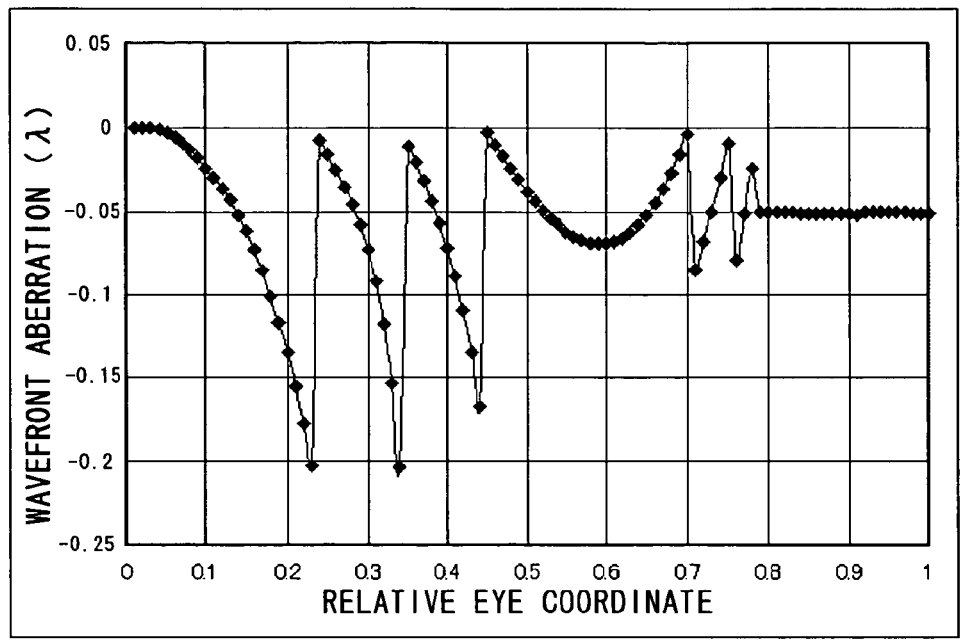
FIGS. 19A and 19B show a wavefront aberration graph of a lens according to a comparative example.
Figure 19B:
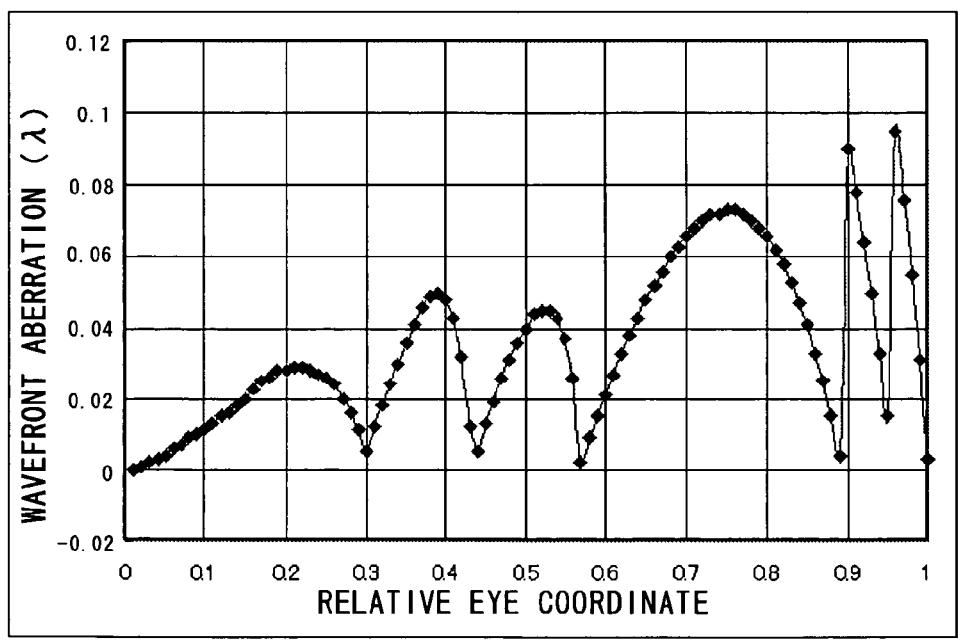

This comparative example changes the value of A16 in Zone 3 of the fourth embodiment shown in Table 8. FIGS. 19A and 19B show the wavefront aberration graph of this example and Table 11 below shows the calculation results regarding Formulas 1 and 2.

TABLE 11

2-4" COMPARATIVE EXAMPLE
1 ZONE - A4 +0.0275
2 ZONES - A16 −0.2
3 ZONES - A16 −0.00335

| DVD | | | RADIUS (mm) | ADJACENT STEP Dj(mm) | REFRACTIVE INDEX n1 | WAVELENGTH λ1(mm) | Naij (DVD) |
|---|---|---|---|---|---|---|---|
| DVD FOCAL LENGTH = 3.360109321 | DVD/CD COMMON USE AREA | D1 | 0.464667 | 0.001314607 | 1.604194 | 0.000655 | 0.138289251 |
| | | D2 | 0.687967 | 0.001333538 | 1.604194 | 0.000655 | 0.204745422 |
| | | D3 | 0.904685 | 0.001416809 | 1.604194 | 0.000655 | 0.269242728 |
| | | D4 | 1.414529 | −0.00129229 | 1.604194 | 0.000655 | 0.420977077 |
| | | D5 | 1.519145 | −0.00130801 | 1.604194 | 0.000655 | 0.452111778 |
| | DVD SOLE USE AREA | D6 | 1.589366 | −0.000057205 | 1.604194 | 0.000655 | 0.473010205 |
| | | D7 | 1.847991 | −0.0025188 | 1.604194 | 0.000655 | |

| DVD | | | ABSOLUTE (Dij*(n1 − 1)/λ1) | K | K × NAij^2/λ1 | Bij | mij | Aij = ABSOLUTE (Bij − mij) |
|---|---|---|---|---|---|---|---|---|
| DVD FOCAL LENGTH = 3.360109321 | DVD/CD COMMON USE AREA | D1 | 1.212637491 | 0.0004 | 0.01167873 | 1.20095876 | 1 | 0.200958763 |
| | | D2 | 1.230100384 | 0.0004 | 0.02560042 | 1.20449996 | 1 | 0.204499964 |
| | | D3 | 1.306911984 | 0.0004 | 0.04426971 | 1.26264228 | 1 | 0.262642276 |
| | | D4 | 1.192053012 | 0.0004 | 0.10822699 | 1.08382602 | 1 | 0.083826020 |
| | | D5 | 1.206553933 | 0.0004 | 0.12482752 | 1.08172642 | 1 | 0.081726415 |
| | DVD SOLE USE AREA | D6 | | | | | | |
| | | D7 | | | | | | |

| CD | | | RADIUS (mm) | ADJACENT STEP Dj(mm) | REFRACTIVE INDEX n2 | WAVELENGTH λ2(mm) | Naij (CD) |
|---|---|---|---|---|---|---|---|
| CD FOCAL LENGTH = 3.382781591 | DVD/CD COMMON USE AREA | D1 | 0.464667 | 0.001314607 | 1.599906 | 0.00079 | 0.137362401 |
| | | D2 | 0.687967 | 0.001333538 | 1.599906 | 0.00079 | 0.203373165 |
| | | D3 | 0.904685 | 0.001416809 | 1.599906 | 0.00079 | 0.267438194 |
| | | D4 | 1.414529 | −0.00129229 | 1.599906 | 0.00079 | 0.418155581 |
| | | D5 | 1.519145 | −0.00130801 | 1.599906 | 0.00079 | 0.449081609 |
| | DVD SOLE USE AREA | D6 | 1.589366 | −0.000057205 | 1.599906 | 0.00079 | 0.46983997 |
| | | D7 | 1.847991 | −0.0025188 | 1.599906 | 0.00079 | |

| CD | | | ABSOLUTE (Dij*(n2 − 1)/λ2) | K | K × NAij^2/λ2 | Bij | mij | Aij = ABSOLUTE (Bij − mij) |
|---|---|---|---|---|---|---|---|---|
| CD FOCAL LENGTH = 3.382781591 | DVD/CD COMMON USE AREA | D1 | 0.998279142 | 0.0004 | 0.00955363 | 0.988725507 | 1 | 0.011274493 |
| | | D2 | 1.012655114 | 0.0004 | 0.02094210 | 0.991713015 | 1 | 0.008286985 |
| | | D3 | 1.075888701 | 0.0004 | 0.03621427 | 1.039674420 | 1 | 0.039674428 |
| | | D4 | 0.981333389 | 0.0004 | 0.08853372 | 0.892799673 | 1 | 0.107200327 |
| | | D5 | 0.993270977 | 0.0004 | 0.10211357 | 0.891157412 | 1 | 0.108842588 |
| | DVD SOLE USE AREA | D6 | | | | | | |
| | | D7 | | | | | | |

| | | MAX(Aij) | MIN(Aij) | MAX(Aij)/MIN(Aij) |
|---|---|---|---|---|
| DVD/CD COMMON USE AREA | D1 | 0.200958763 | 0.011274493 | 17.8242 |
| | D2 | 0.204499964 | 0.008286985 | 24.6772 |
| | D3 | 0.262642276 | 0.039674428 | 6.6199 |
| | D4 | 0.107200327 | 0.083826020 | 1.2788 |
| | D5 | 0.108842588 | 0.081726415 | 1.3318 |

FIG. 19B shows that the wavefront aberration for CD is further reduced in Zone 3 as well compared to the fourth embodiment. While the wavefront aberration for CD in Zone 3 is 0 to 0.098 λ in the second, third, and fourth embodiments shown in FIGS. 11, 17B, and 18B, it is reduced to −0.01 to 0.04 λ in the comparative example in FIG. 19B. On the other hand, though the wavefront aberration for DVD in Zone 3 is 0 to −0.1 λ in the second, third, and fourth embodiments shown in FIGS. 11 and 17A, and 18A, it is increased to 0 to −0.2 λ in the comparative example shown in FIG. 19A. The RMS wavefront aberration is as follows:

| | DVD | CD |
|---|---|---|
| Embodiment 2: | 0.01945 λRMS | 0.02525 λRMS |
| Embodiment 3: | 0.02495 λRMS | 0.02574 λRMS |
| Embodiment 4: | 0.02926 λRMS | 0.02489 λRMS |
| Comparative Case: | 0.03503 λRMS | 0.02477 λRMS |

The RMS wavefront aberration for DVD is increased in the comparative example further than in the fourth embodiment, and it exceeds 0.035 λRMS. As for Formulas 1 and 2, as shown in Table 11, the value of MAX(Aij)/MIN(Aij) in the portions corresponding to D1, D2, and D3 are 17.8242, 24.6772, and 6.6199, which are more than 3 and of course more than 2 in the comparative example. The value is not more than 2 in the portions corresponding to D4 and D5; thus, MAX(Aij)/MIN(Aij)<2 is satisfied in two portions out of five, but not satisfied in the other three portions. This comparative example shows that the RMS wavefront aberration undesirably exceeds 0.035 λRMS for both DVD and CD if the above formula is satisfied only in two portions out of five.

Although the explanations have been given on the case of using a combination of DVD and CD, the present invention is also effective for a case of using a combination of discs with the same substrate thickness and different wavelengths. An example is a combination of so-called Blue-laser disc with 0.6 mm in substrate thickness and 405 nm in wavelength, and DVD with 0.6 mm in substrate thickness and 655 nm in wavelength. The following fifth embodiment describes this case.

In the fifth embodiment, the lens structure is basically the same as that of the second embodiment shown in FIG. 2, where parallel light is incident on the side A to form an appropriate optical spot on the information surface of a disc substrate (not shown) located at the side B. The relationship of $Z_A$ and h at the side A close to a light source is expressed by Formula 4. The specific values are shown in the Zones 1 to 9 in the upper row of Table 12. The relationship of $Z_B$ and h at the side B close to a disc, which is located opposite from the light source, is expressed by Formula 6. The specific values are shown in the lower row of Table 12.

The distance between the surface apexes f and e on the optical axis of the objective lens, which is a center thickness $t_0$, is 1.94 mm. The refractive index n for wavelength λ1=405 nm (BLUE) is 1.54972, and the refractive index n for wavelength λ2=655 nm (DVD) is 1.53. The thickness and refractive index of a transparent substrate are 0.6 mm and 1.6235 for wavelength λ1=405 nm (BLUE) and 0.6 mm and 1.58 for λ2=655 nm (DVD). NA and focal distance for Blue-laser of wavelength 405 nm are 0.65 and 3.1015 mm, and those for DVD of wavelength 655 nm are 0.6277 and 3.2116 mm, respectively. The active diameter of incident parallel light beam is φ4.032 for both BLUE and DVD. The fifth embodiment has no equivalent for the DVD sole use area in the first to fourth embodiments, and the entire surface with φ4.032 on the side A of the lens serves as a BLUE/DVD common use area.

Figure 20A:
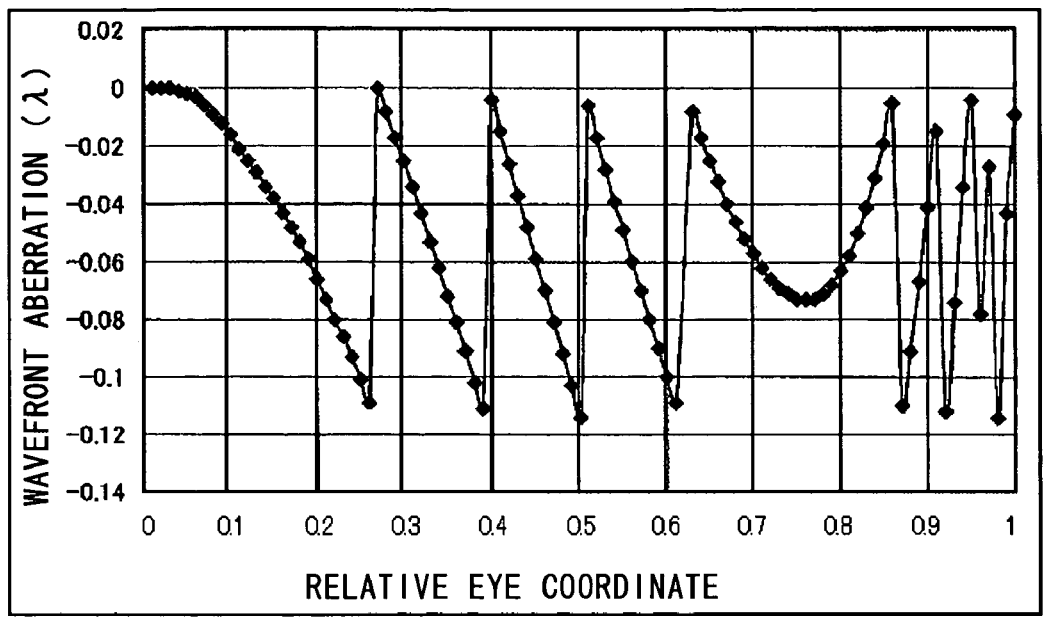
FIGS. 20A and 20B show a wavefront aberration graph of a lens according to the fifth embodiment of the present invention.
Figure 20B:
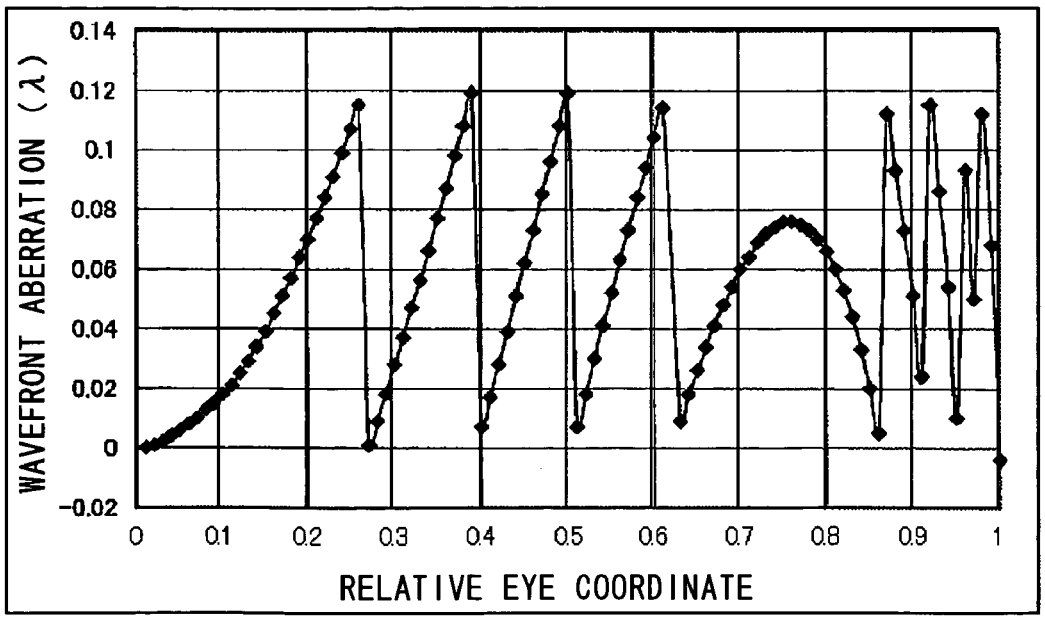

FIGS. 20A and 20B show the wavefront aberration graph of the fifth embodiment. The RMS wavefront aberration for BLUE is 0.03152 λRMS and that for DVD is 0.03237 RMS; both of which thus do not exceed 0.035 λRMS. Table 13 below shows the values regarding Formulas 1 and 2.

TABLE 12

SIDE A

| ZONE j | | 1 | 2 | 3 | 4 | 5 |
|---|---|---|---|---|---|---|
| h | LOWER LIMIT | 0 | 0.542467 | 0.792615 | 1.014927 | 1.249884 |
|   | UPPER LIMIT | 0.542467 | 0.792615 | 1.014927 | 1.249884 | 1.740929 |
| B |   | 0 | −0.001473477 | −0.002946954 | −0.004420431 | −0.005893908 |
| C |   | 0.509478595 | 0.5104812 | 0.511012577 | 0.510002683 | 0.510089832 |
| K |   | −1.3369195 | −0.8287777 | −0.8105968 | −0.7537146 | −0.7469151 |
| A4 |   | −4.16576E−05 | 0.003116516 | 0.003289505 | 0.004372048 | 0.004157114 |
| A6 |   | 0.258242912 | 0.004761572 | 0.00191368 | 0.000112694 | 0.000283638 |
| A8 |   | −2.171510837 | −0.000539419 | 0.001174357 | 0.000166003 | 5.499882E−05 |
| A10 |   | 9.398682567 | −0.004428822 | −0.001259228 | 3.098863E−05 | −3.950521E−06 |
| A12 |   | −19.60835322 | 0.003469841 | −0.001086548 | −4.170906E−05 | −1.297888E−05 |
| A14 |   | 13.07840955 | −0.003183954 | 0.00149111 | −6.216377E−06 | 5.481453E−06 |
| A16 |   | 6.844157513 | 0.003264944 | −0.000424563 | 5.927209E−06 | −6.448557E−07 |

SIDE A

| ZONE j | | 6 | 7 | 8 | 9 |
|---|---|---|---|---|---|
| h | LOWER LIMIT | 1.740929 | 1.850763 | 1.92125 | 1.975027 |
|   | UPPER LIMIT | 1.850763 | 1.92125 | 1.975027 | 2.2 |
| B |   | −0.004420431 | −0.002946954 | −0.001473477 | 0 |
| C |   | 0.508291764 | 0.518471856 | 0.51922374 | 0.513715431 |
| K |   | −0.7212068 | −0.7734512 | −0.7752421 | −0.7540451 |
| A4 |   | 0.005173403 | 0.004007756 | 0.003997983 | 0.004280322 |
| A6 |   | −8.23490E−05 | −0.000307572 | −0.000302425 | −0.000136405 |
| A8 |   | −3.19440E−05 | 5.267685E−06 | 4.8548173E−06 | 2.5114717E−05 |
| A10 |   | 4.50425E−06 | 3.460593E−05 | 3.3523674E−05 | 2.7589154E−05 |
| A12 |   | −6.74502E−06 | −1.429376E−06 | −2.6102373E−06 | −5.8345645E−06 |
| A14 |   | 6.84527E−06 | 3.389613E−06 | 3.3068712E−06 | 2.6646516E−06 |
| A16 |   | −1.13608E−06 | −7.976428E−07 | −6.9376700E−07 | −4.5308929E−07 |

| SIDE B | R2 |
|---|---|
| C | −0.118642624 |
| K | −95.56799 |
| A4 | 0.00129653 |
| A6 | 4.3291237E−05 |
| A8 | −1.1572493E−05 |
| A10 | −2.0639003E−06 |

TABLE 13

FIFTH EMBODIMENT

| BLUE | | | RADIUS (mm) | ADJACENT STEP Dj(mm) | REFRACTIVE INDEX n1 | WAVELENGTH $\lambda$ 1(mm) | Naij (DVD) |
|---|---|---|---|---|---|---|---|
| BLUE FOCAL LENGTH = 3.1015 | BLUE/DVD COMMON USE AREA | D1 | 0.542467 | −0.001406696 | 1.54972 | 0.000405 | 0.174905 |
| | | D2 | 0.792615 | −0.00142944 | 1.54972 | 0.000405 | 0.255559 |
| | | D3 | 1.014927 | −0.001459163 | 1.54972 | 0.000405 | 0.327237 |
| | | D4 | 1.249884 | −0.00150259 | 1.54972 | 0.000405 | 0.402993 |
| | | D5 | 1.740929 | 0.001650686 | 1.54972 | 0.000405 | 0.561318 |
| | | D6 | 1.850763 | 0.001696813 | 1.54972 | 0.000405 | 0.596732 |
| | | D7 | 1.92125 | 0.001729803 | 1.54972 | 0.000405 | 0.619458 |
| | | D8 | 1.975027 | 0.00176069 | 1.54972 | 0.000405 | 0.636797 |

| BLUE | | | ABSOLUTE (Dij*(n1 − 1)/$\lambda$ 1) | K | K × NAij$^2$/$\lambda$ 1 | Bij | mij | Aij = ABSOLUTE (Bij − mij) |
|---|---|---|---|---|---|---|---|---|
| BLUE FOCAL LENGTH = 3.1015 | BLUE/DVD COMMON USE AREA | D1 | 1.909355938 | 0.0004 | 0.03021399 | 1.87914195 | 2 | 0.120858049 |
| | | D2 | 1.940226932 | 0.0004 | 0.06450390 | 1.87572303 | 2 | 0.124276968 |
| | | D3 | 1.980570523 | 0.0004 | 0.10576233 | 1.87480819 | 2 | 0.125191807 |
| | | D4 | 2.039515782 | 0.0004 | 0.16039869 | 1.87911709 | 2 | 0.120882907 |
| | | D5 | 2.240531313 | 0.0004 | 0.38898560 | 1.85154571 | 2 | 0.148454292 |
| | | D6 | 2.303140665 | 0.0005 | 0.43961553 | 1.86352513 | 2 | 0.136474866 |
| | | D7 | 2.34791879 | 0.0005 | 0.47373904 | 1.87417975 | 2 | 0.125820245 |
| | | D8 | 2.389843632 | 0.0005 | 0.50063071 | 1.88921293 | 2 | 0.110787075 |

| DVD | | | RADIUS (mm) | ADJACENT STEP Dj(mm) | REFRACTIVE INDEX n2 | WAVELENGTH $\lambda$ 2(mm) | Naij (DVD) |
|---|---|---|---|---|---|---|---|
| DVD FOCAL LENGTH = 3.2116 | BLUE/DVD COMMON USE AREA | D1 | 0.542467 | −0.001406696 | 1.53 | 0.000655 | 0.168909 |
| | | D2 | 0.792615 | −0.00142944 | 1.53 | 0.000655 | 0.246798 |
| | | D3 | 1.014927 | −0.001459163 | 1.53 | 0.000655 | 0.316019 |
| | | D4 | 1.249884 | −0.00150259 | 1.53 | 0.000655 | 0.389178 |
| | | D5 | 1.740929 | 0.001650686 | 1.53 | 0.000655 | 0.542075 |
| | | D6 | 1.850763 | 0.001696813 | 1.53 | 0.000655 | 0.576274 |
| | | D7 | 1.92125 | 0.001729803 | 1.53 | 0.000655 | 0.598222 |
| | | D8 | 1.975027 | 0.00176069 | 1.53 | 0.000655 | 0.614967 |

| DVD | | | ABSOLUTE (Dij*(n2 − 1)/$\lambda$ 2) | K | K × NAijj$^2$/$\lambda$ 2 | Bij | mij | Aij = ABSOLUTE (Bij − mij) |
|---|---|---|---|---|---|---|---|---|
| DVD FOCAL LENGTH = 3.2116 | BLUE/DVD COMMON USE AREA | D1 | 1.138242903 | 0.0004 | 0.01742298 | 1.12081992 | 1 | 0.120819923 |
| | | D2 | 1.156646328 | 0.0004 | 0.03719635 | 1.11944997 | 1 | 0.119449975 |
| | | D3 | 1.180696746 | 0.0004 | 0.06098814 | 1.11970860 | 1 | 0.119708603 |
| | | D4 | 1.215836355 | 0.0004 | 0.09249435 | 1.12334200 | 1 | 0.123342004 |
| | | D5 | 1.335669696 | 0.0004 | 0.17944771 | 1.15622199 | 1 | 0.156221990 |
| | | D6 | 1.372993618 | 0.0005 | 0.25350552 | 1.11948810 | 1 | 0.119488096 |
| | | D7 | 1.399687636 | 0.0005 | 0.27318294 | 1.12650470 | 1 | 0.126504701 |
| | | D8 | 1.4246807 | 0.0005 | 0.28869009 | 1.13599061 | 1 | 0.135990607 |

| | | MAX(Aij) | MIN(Aij) | MAX(Aij)/ MIN(Aij) |
|---|---|---|---|---|
| BLUE/DVD COMMON USE AREA | D1 | 0.120858049 | 0.120819923 | 1.0003 |
| | D2 | 0.124276968 | 0.119449975 | 1.0404 |
| | D3 | 0.125191807 | 0.119708603 | 1.0458 |
| | D4 | 0.123342004 | 0.120882907 | 1.0203 |
| | D5 | 0.156221990 | 0.148454292 | 1.0523 |
| | D6 | 0.136474866 | 0.119488096 | 1.1422 |
| | D7 | 0.126504701 | 0.125820245 | 1.0054 |
| | D8 | 0.135990607 | 0.110787075 | 1.2275 |

Figure 21A:
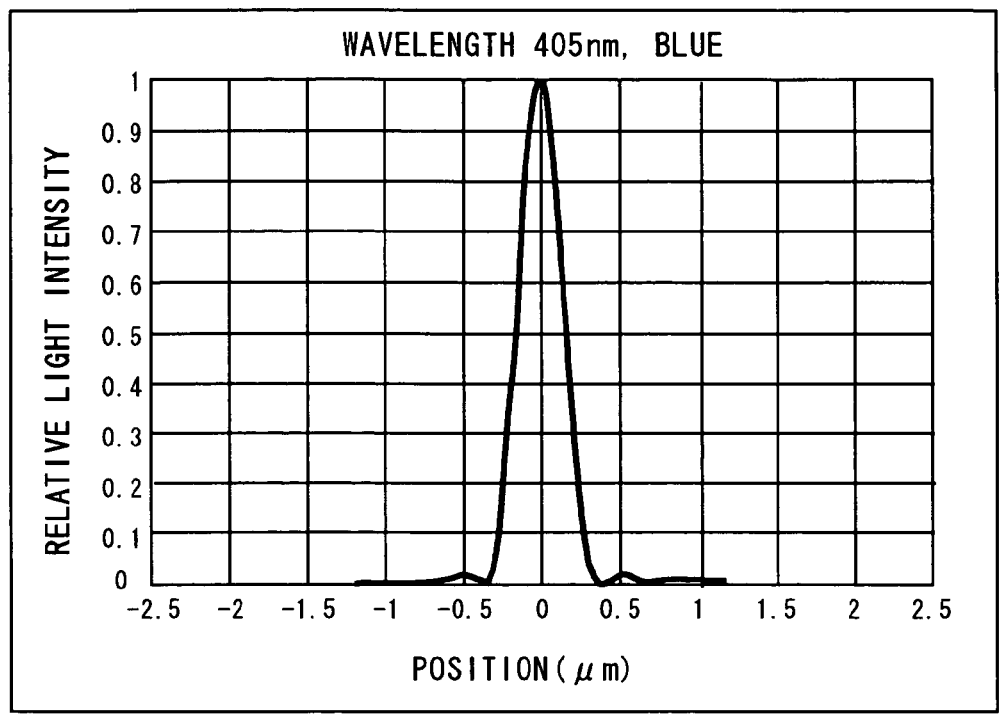
FIGS. 21A and 21B show an optical spot graph of a lens according to the fifth embodiment of the present invention.
Figure 21B:
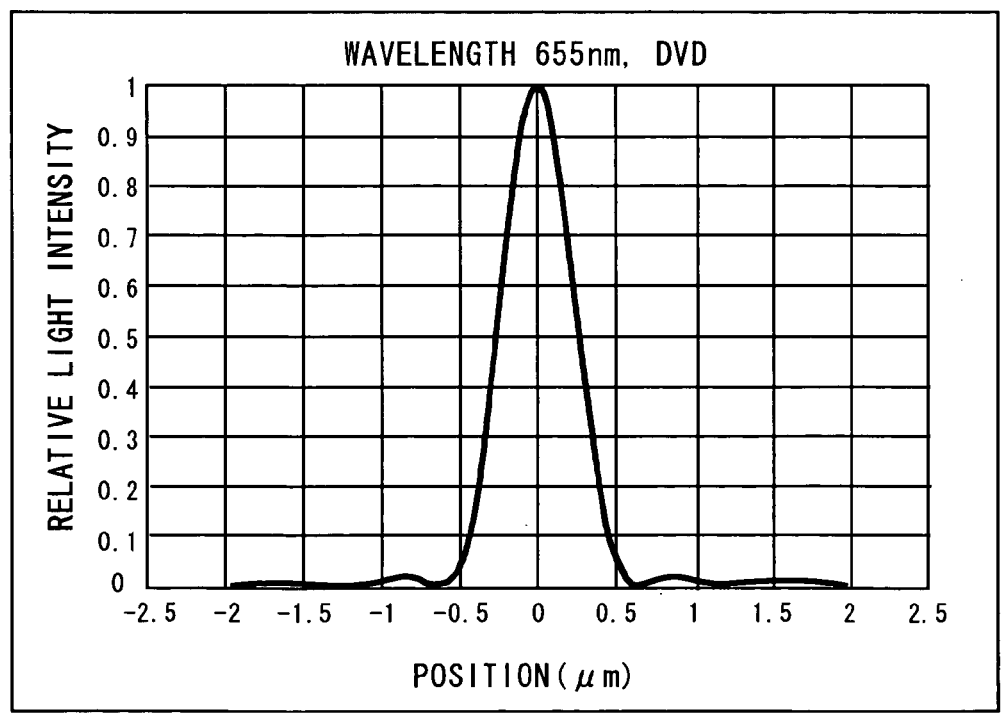

The value of MAX(Aij)/MIN(Aij) does not exceed 1.23 in all the step portions with the heights D1 to D8; thus, Formulas 1 and 2 are satisfied in all the step portions. FIGS. 21A and 21B show the optical spot diagrams according to the fifth embodiment. The diameter of an optical spot with the relative light intensity of $1/e^2$ (=0.135) is 0.5149 μm for BLUE with 405 nm in wavelength and 0.8606 μm for DVD with 655 nm in wavelength.

The value of $W_{max}/W_{min}$ in the fifth embodiment is: $W_{max}/W_{min}$=0.03237/0.03152=1.026967; thus, it is below the allowable values of 1.8, 1.6, and 1.4. In the fifth embodiment, the values equivalent to those in Table 3 are: $\Delta V_d(\lambda 405)$=0.11 to 0.12 $\lambda$ and $\Delta V_d(\lambda 655)$=0.11 to 0.12 $\lambda$ in Zones 1 to 4, and 6 to 9; thus, the ratios of the difference in wavefront aberration $\Delta V_d(\lambda 405)/\Delta V_d(\lambda 655)$ and $\Delta V_d(\lambda 655)/\Delta V_d(\lambda 405)$ both fall in the range of 0.9 and 1.1. In Zone 5, $\Delta V_d(\lambda 405)$=0.075k and $\Delta V_d(\lambda 655)$=0.078 $\lambda$. Though the wavefront aberration graphs in FIGS. 20A and 20B show the results calculated for every 0.01 relative eye in the relative eye coordinate 0 to 1, more detailed calculation results in the above values.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A multi-wavelength lens for condensing a plurality of kinds of monochromatic light by refraction, comprising:
   a common use area for all monochromatic light on at least one lens surface, the area sectioned into a plurality of aspherical zones each of which having a different refractive power; and
   step portions, each of which formed between adjacent aspherical zones of the plurality of aspherical zones and having a step height Dj (j=1, 2, 3, 4, and so on, in order of closeness to a lens optical axis) in a direction parallel to the lens optical axis,
   wherein at least half the number of the step heights of the step portions satisfy MAX(Aij)/MIN(Aij)<3,
   wherein MIN(Aij) and MAX(Aij) are minimum and maximum values of phase shift amount Aij derived from said step height for each wavelength $\lambda i$, respectively, Aij=absolute (Bij−mij), Bij=absolute(Dj))*(ni−1)/$\lambda i$−(NAij$^2$)*K/$\lambda i$, ni is a refractive index of a lens for a wavelength $\lambda i$, mij is an integral number closest to Bij, and NAij is a numeral aperture (NA) of each of the aspherical zones defined by each of the step portions for a wavelength $\lambda i$:

$K$=0.0004 mm when NAij <0.55

$K$=0.0005 mm when NAij >=0.55.

2. The multi-wavelength lens according to claim 1, wherein at least half of the step portions satisfy a following formula:

MAX(Aij)/MIN(Aij)<2.

3. The multi-wavelength lens according to claim 2, wherein all of the step portions satisfy the formula MAX(Aij)/MIN(Aij)<2.

4. The multi-wavelength lens according to claim 1, wherein all of the step portions satisfy the formula MAX(Aij)/MIN(Aij)<3.

5. A lens having a positive power for condensing light from a light source to form an optical spot on a focus surface, comprising:
   a use area on one surface or both surfaces of the lens; and
   a nonuse area located outside of the use area,
   wherein a diameter of an optical spot obtained when light from the light source is incident on both of the use area and the nonuse are is smaller than a diameter of an optical spot obtained when light from the light source is incident on the use area only,
   wherein a root mean square (RMS) wavefront aberration of the positive power is no more than 0.035 $\lambda$, and the RMS wavefront aberration satisfies $1 \leq W_{max}/W_{min} < 1.8$,
   where $W_{max}$ is the maximum RMS wavefront aberration, and $W_{min}$ is the minimum wavefront aberration, of the n kinds of different wavelength $\lambda i$.

6. The lens according to claim 5, wherein the lens is a multi-wavelength lens for condensing a plurality of kinds of monochromatic light having a plurality of wavelengths, and a nonuse area for a first wavelength serves as a use area for a second wavelength different from the first wavelength.

7. The multi-wavelength lens according to claim 6, wherein the area serving as the nonuse area for the first wavelength and as the use area for the second wavelength is sectioned into a plurality of zones on one surface or both surfaces of the lens, and a phase shift due to wavefront aberration caused by light having the second wavelength passing through each of the plurality of zones is substantially an integral multiple of each other.

* * * * *